(12) United States Patent
Mather et al.

(10) Patent No.: US 8,087,696 B2
(45) Date of Patent: Jan. 3, 2012

(54) VEHICLE OCCUPANT RESTRAINT AND METHOD

(75) Inventors: Bruce Alan Mather, Hockessin, DE (US); Charles McLean Carter, Lafayette Hill, PA (US); Phillip Bruce Mather, Adrian, MI (US)

(73) Assignee: Lap Belt Cinch, Inc., Lafayette Hill, PA (US)

( * ) Notice: Subject to any disclaimer, the term of this patent is extended or adjusted under 35 U.S.C. 154(b) by 273 days.

(21) Appl. No.: 12/157,559

(22) Filed: Jun. 11, 2008

(65) Prior Publication Data

US 2009/0008919 A1    Jan. 8, 2009

Related U.S. Application Data

(60) Provisional application No. 60/943,143, filed on Jun. 11, 2007, provisional application No. 60/975,218, filed on Sep. 26, 2007.

(51) Int. Cl.
*B60R 22/34* (2006.01)

(52) U.S. Cl. ......................................... 280/807; 297/476

(58) Field of Classification Search .................. 280/807; 297/474, 476, 479; 24/170, 171
See application file for complete search history.

(56) References Cited

U.S. PATENT DOCUMENTS

| | | | |
|---|---|---|---|
| 3,013,317 A * | 12/1961 | Weber | 24/637 |
| 3,231,307 A * | 1/1966 | Smith | 297/476 |
| 3,233,296 A * | 2/1966 | Whittingham | 242/381.3 |
| 3,276,085 A | 10/1966 | Spranger | |
| 3,344,486 A | 10/1967 | Eveland | |
| 3,409,949 A * | 11/1968 | Kobrehel et al. | 242/381.3 |
| 3,888,541 A | 6/1975 | Stephenson | |
| 3,913,977 A | 10/1975 | Takada | |
| 4,291,918 A * | 9/1981 | Finn et al. | 297/483 |
| 4,294,467 A | 10/1981 | Frantom | |
| 4,306,735 A | 12/1981 | Pfeiffer et al. | |
| 4,310,175 A | 1/1982 | Pickett | |
| 4,371,192 A | 2/1983 | Alix | |
| 4,452,469 A | 6/1984 | Rogers, Jr. | |
| 4,480,854 A | 11/1984 | Doty | |
| 4,486,031 A | 12/1984 | Holler et al. | |
| 4,588,207 A | 5/1986 | Doty | |
| 4,726,625 A | 2/1988 | Bougher | |

(Continued)

OTHER PUBLICATIONS

International Search Report from International Application No. PCT/2008/007277, dated Sep. 25, 2008. Form PCT/ISA/210.

(Continued)

*Primary Examiner* — Drew Brown
(74) *Attorney, Agent, or Firm* — Morgan Lewis & Bockius LLP

(57) ABSTRACT

A component of a vehicle occupant restraint system, the vehicle occupant restraint system having a webbing with a lap belt portion and a shoulder belt portion contiguous with the lap belt portion, the component including a web engaging device adapted to toggle between an open and an engaged condition, wherein in the open condition the webbing is moveable relative to the web engaging device in two directions along the webbing, wherein in the engaged condition the webbing is moveable relative to the web engaging device in only one direction along the webbing, and wherein the web engaging device is lockable in the open condition. A vehicle occupant restraint system including a webbing with lap and shoulder belt portions, a component having a web engaging device adapted to toggle between an open and an engaged condition, and a tensioner configured to respond to at least one of the open and engaged conditions.

33 Claims, 33 Drawing Sheets

U.S. PATENT DOCUMENTS

| | | | | |
|---|---|---|---|---|
| 4,871,190 A | * | 10/1989 | Willey | 280/801.1 |
| 4,903,377 A | | 2/1990 | Doty | |
| 4,935,994 A | | 6/1990 | Boone et al. | |
| 4,979,764 A | * | 12/1990 | Drinane et al. | 280/808 |
| 5,000,481 A | | 3/1991 | Willson | |
| 5,050,274 A | | 9/1991 | Staniszewski et al. | |
| 5,058,244 A | | 10/1991 | Fernandez | |
| 5,100,176 A | | 3/1992 | Ball et al. | |
| 5,138,749 A | | 8/1992 | McCune et al. | |
| 5,222,278 A | | 6/1993 | Ball et al. | |
| 5,311,653 A | | 5/1994 | Merrick | |
| 5,350,196 A | | 9/1994 | Atkins | |
| 5,417,455 A | * | 5/1995 | Drinane et al. | 280/808 |
| 5,548,874 A | | 8/1996 | Mishina et al. | |
| 5,649,341 A | | 7/1997 | Ashline et al. | |
| 5,765,774 A | | 6/1998 | Maekawa et al. | |
| 5,788,281 A | | 8/1998 | Yanagi et al. | |
| 5,788,282 A | | 8/1998 | Lewis | |
| 5,806,148 A | | 9/1998 | McFalls et al. | |
| 5,870,816 A | | 2/1999 | McFalls et al. | |
| 5,979,982 A | | 11/1999 | Nakagawa | |
| 5,983,463 A | | 11/1999 | Prentkowski et al. | |
| 6,139,059 A | | 10/2000 | Metzger | |
| 6,213,508 B1 | | 4/2001 | Cornell | |
| 6,390,562 B1 | | 5/2002 | Takamizu et al. | |
| 6,631,537 B1 | | 10/2003 | Huang | |
| 6,708,380 B2 | | 3/2004 | Schneider et al. | |
| 6,832,781 B2 | | 12/2004 | Rastegar et al. | |
| 6,938,925 B2 | | 9/2005 | Mather | |
| 7,185,919 B2 | | 3/2007 | Mather et al. | |
| 7,353,573 B2 | * | 4/2008 | Anscher | 24/625 |
| 2003/0111835 A1 | | 6/2003 | Sullivan | |

OTHER PUBLICATIONS

Written Opinion from International Application No. PCT/2008/007277, dated Sep. 25, 2008. Form PCT/ISA/237.

* cited by examiner

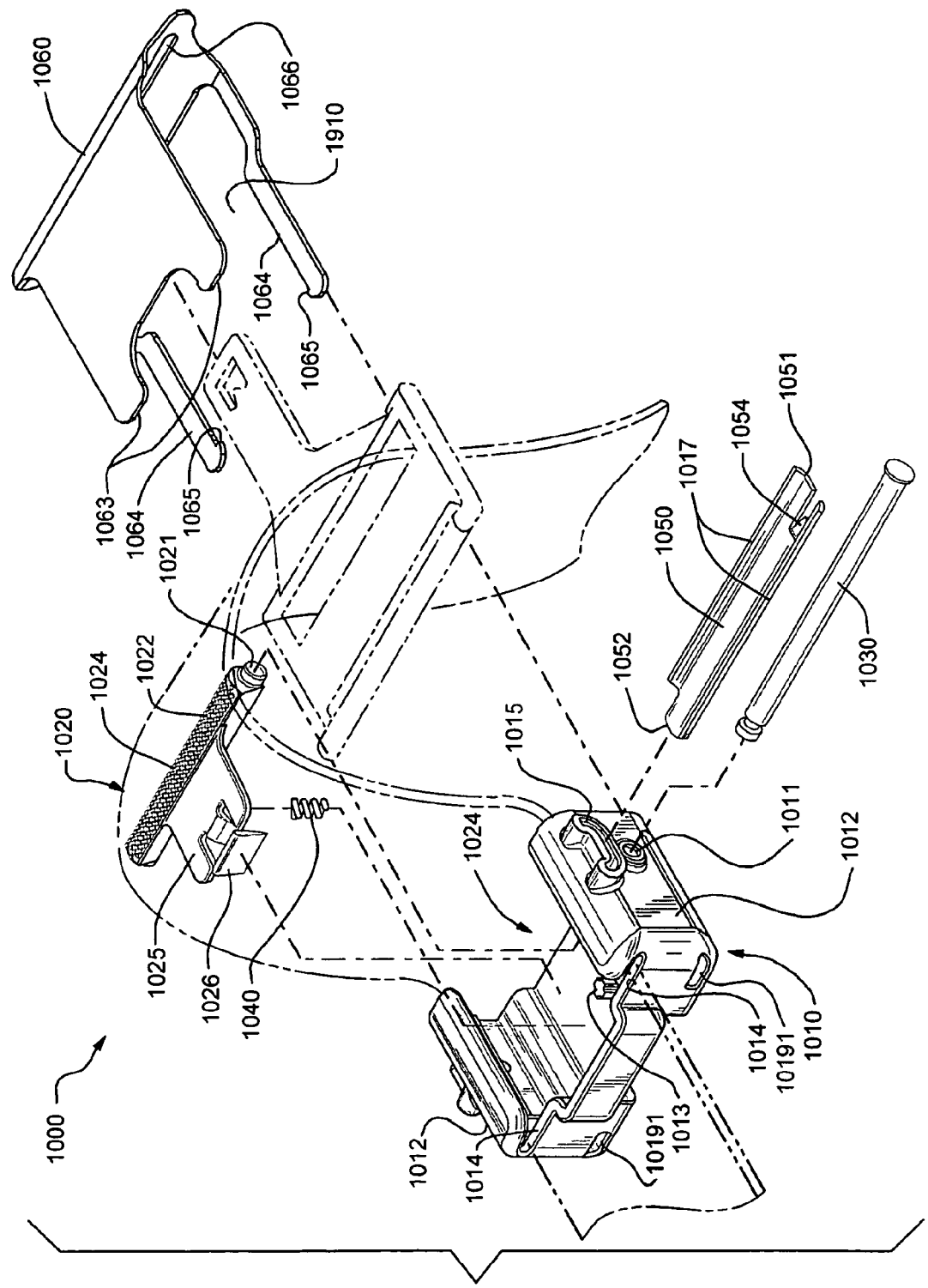

VEHICLE OCCUPANT RESTRAINT AND METHOD

CROSS REFERENCE TO RELATED APPLICATIONS

This patent application claims the benefit of U.S. Provisional applications Ser. Nos. 60/943,143, filed Jun. 11, 2007, and 60/975,218, filed Sep. 26, 2007, both of which applications are incorporated herein by reference in their entireties.

FIELD OF THE INVENTION

This invention relates to the field of occupant restraint systems such as those that may be found in passenger vehicles, construction equipment, aircraft and the like.

BACKGROUND OF THE INVENTION

So-called three-point continuous loop seat belt systems are typically used in cars and trucks in many countries, including the United States. The systems typically include a seat belt retractor, a D-ring, a floor mounting attachment point, and a buckle assembly, each fixed to the vehicle; a length of belt webbing; and a tongue assembly. The belt webbing typically extends from the retractor through the D-ring to an anchor point near the vehicle floor. The tongue assembly is typically slidable along the length of belt webbing between the D-ring and anchor point.

To use the seat belt system, a vehicle occupant typically grasps the tongue assembly, pulling the belt across his/her body, and inserts an end of the tongue assembly into the buckle assembly. When the tongue assembly is fastened to the buckle assembly, a portion of the belt webbing typically extends across the lap of the vehicle occupant. Releasing the tongue assembly from the buckle assembly typically results in the belt webbing being rewound by the retractor.

The tongue assembly needs to slide freely along the belt when the occupant moves the tongue assembly toward the buckle to provide simple and convenient belt length adjustment because not all drivers are the same size, and to compensate for clothing thicknesses such as the use of jackets in the winter. The tongue assembly should also slide along the belt after the occupant unlocks the tongue assembly from the buckle assembly so that the retractor can fully retract the belt. Otherwise, the retractor would carry the tongue assembly to the D-ring, whereupon further movement of the belt would be prevented as the D-ring blocked further movement of the tongue assembly. Free movement of the belt webbing is also critical because tightening of the shoulder belt portion may also lock or tighten the lap belt portion.

In most modern vehicle seat belt systems, the seat belt retractor remains "unlocked." This permits slack in both the shoulder belt and lap belt portions. The objective of allowing the slack is to permit driver comfort and the ability to reach forward (e.g., to adjust a radio or climate control) without having to loosen or unbuckle the seat belt. However, in the event of many types of accident the seat belt retractor locks, thus reducing further forward motion of the occupant during deceleration. In many modern systems, a "pre-tensioner" mechanism tries to proactively tighten the seat belt upon detection of an impact for faster occupant restraint. The pretensioning retraction of the shoulder belt also tightens the lap belt portion because the continuous belt web slides freely through the tongue.

During high performance and off-road driving, loose lap belts allow the driver and passengers to slide in their seats, resulting in loss of optimum vehicle control; loose lap belts allow "slumping" or "slouching," which can become tiring and induce fatigue during multi-hour trips; and when an infant or child car seat, or booster seat is used, loose lap belts permit unsafe seat movement and potentially dangerous stability situations. In some events, the slack of the typical seat belt design fails to provide a desired degree of controllable restraint in non-accident situations because the lap belt portion of the system is loose.

Most modern seat belt systems include a "pretensioner" that tries to tighten up any slack in the belt webbing in the event of a crash. While the conventional locking system in a retractor keeps the belt from extending any farther, the pretensioner actually pulls on the belt, working together with the locking mechanism in the retractor. Pretensioners are generally wired to the same central control processor that activates the car's air bags. The central control processor monitors motion sensors that respond to the sudden deceleration of an impact, and activates the pretensioner and the air bag after detection of the initiation of an impact.

There is a delay between the moment of impact of a vehicle and the activation of a pretensioner. In this brief interval, the belt webbing may be pulled out of the retractor enough to expose a wearer to greater G-forces (as a result of the occupant slowing down in a shorter distance than if he/she were firmly strapped to the seat), and increase the likelihood of his/her body coming into contact with parts of the car such as the chest on the steering wheel, knees on the instrument panel, hips on the door, or head on the roof.

With the increased number of sport utility vehicles (SUVs) on the roads, with their more top heavy bodies, there has been a large increase in traffic fatalities due to vehicle rollover accidents. Because the forces involved in a rollover are different than those involved in collisions for which seat belt systems were designed, the pretensioners often do not work, leaving a vehicle occupant's body free to move about the interior of the vehicle. Because the ceiling of a vehicle is typically only inches from the occupant's head, the rollover often results in massive head or neck injuries, causing death or paralysis.

SUMMARY OF THE INVENTION

In one embodiment, there is a component of a vehicle occupant restraint system, the vehicle occupant restraint system having a webbing with a lap belt portion and a shoulder belt portion contiguous with the lap belt portion wherein the component includes a web engaging device adapted to move between an open and an engaged condition. In one embodiment the movement is a toggle. In one embodiment, in the open condition the webbing is moveable relative to the web engaging device in two directions along the webbing. In one embodiment, in the engaged condition the webbing is moveable relative to the web engaging device in only one direction along the webbing. In one embodiment, the web engaging device is lockable in the open condition.

In one embodiment, the component further includes a slip tongue engageable with a buckle. In one embodiment, the component is adapted to automatically toggle from the open condition to the engaged condition when the slip tongue is engaged with the buckle. In one embodiment, the component is adapted to automatically toggle from the engaged condition to the open condition when the slip tongue is disengaged from the buckle. In one embodiment, the web engaging device of the component is adapted to be at least one of: a) lockable in the open condition for a predetermined period of time; b) disengaged from the webbing until purposefully engaged;

and c) disengaged from the webbing for a fixed period of time. In one embodiment, the web engaging device is adapted to be at least one of a) lockable in the open condition until manually or automatically engaged; b) lockable in the engaged position until manually or automatically placed in the open condition; c) momentarily engaged; and d) momentarily placed in the open condition.

In one embodiment, the web engaging device includes a web engaging surface that engages the webbing in the engaged condition and a switch that is positionable to cause the web engaging surface to disengage from the webbing in a locked position. The web engaging surface may be positioned on a cam, and in one embodiment, the switch includes a lever arm attached to the cam being selectively engageable with a feature of the component to lock the component in the open condition. In one embodiment, the component further includes a biasing device configured to bias the web engaging device in at least one of the open and the engaged conditions. In one embodiment, a biasing device is configured to impact the switch to bias the belt engaging surface against the webbing in the engaged condition.

In one embodiment, the component further includes a housing having an engagement for accepting a portion of the web engaging device when the component is in the open condition such that the web engaging device is lockable and unlockable with the engagement. In one embodiment, the web engaging device includes a resilient retainer element that cooperates with the engagement to toggle the component between the open condition and the engaged condition.

In one embodiment, the component includes a housing, wherein a portion of the web engaging device is configured to engage with the housing to lock the web engaging device in the open condition. In some embodiments, the housing engaging portion may include at least one of a spring clip, a sliding retainer, a detent, a servo-relay, an electrical magnet, a permanent magnet, and a pin.

In one embodiment, a component may include a housing having two opposing side portions, a web engaging device secured to both side portions such that the web engaging device is pivotable between the opposing side portions to toggle the component between the open condition and the engaged condition. The component may also include a switch associated with the web engaging device, positioned within an opening of the housing and configured and dimensioned to toggle the web engaging device between the locked open condition and the engaged condition. In one embodiment, the portion of the switch positioned within the housing is accessible to a user when the component is under load. In one embodiment, the housing further includes a plate securable to both side portions such that the webbing is disposed between the web engaging device and the plate, the component being configured and dimensioned such that the web engaging device urges the webbing against the plate when the component is in the engaged condition.

In one embodiment, a component of the present invention may include a housing and further include a yoke. In one embodiment, the yoke is coupleable to the housing when the yoke is engaged with a tongue (e.g. a slip tongue attached to the webbing). In one embodiment, the yoke is adapted to engage a surface within the housing to retain the yoke to the housing. In one embodiment the component includes a housing for carrying the web engaging device that is configured to cooperate with the yoke to secure the component to the vehicle occupant restraint system. In a preferred embodiment, the yoke is coupleable to the housing at various depths within the housing, thus permitting the yoke to engage with tongues of varying sizes. The housing in one embodiment further includes an engagement for accepting a portion of the web engaging device when the component is in the open condition such that the web engaging device is lockable and unlockable with the engagement. In one embodiment, the web engaging device includes a resilient retainer element that cooperates with the engagement to toggle the component between the open condition and the engaged condition. In one embodiment the component includes a base. In one embodiment, the base is a separate component engageable with the housing. In one embodiment the base is integral with the housing. In one embodiment, the base is integral with the yoke. In one embodiment, the webbing is urged against the base when the component is in the engaged condition.

In a preferred embodiment, the component is configured such that slack developed in the shoulder belt portion is not translatable to the lap belt portion when the component is in the engaged position. Thus in one embodiment, the component is adapted to permit a tension to be maintained in the lap belt portion that is greater than a tension in the shoulder belt portion when the component is in the engaged position.

In one embodiment, there is a vehicle occupant restraint system including a webbing with a lap belt portion and a shoulder belt portion contiguous with the lap belt portion, a tensioner, and a component having a web engaging device adapted to toggle between an open and an engaged condition. In one embodiment, in the open condition the webbing is moveable relative to the web engaging device in two directions along the webbing. In one embodiment, in the engaged condition the webbing is moveable relative to the web engaging device in only one direction along the webbing. In one embodiment, the tensioner is configured to respond to at least one of the open condition and the engaged condition of the web engaging device. In one embodiment, the tensioner is configured to tension the webbing to a predetermined tension when a slip tongue of the vehicle occupant restraint system is first engaged with a buckle. In one embodiment, the tensioner is configured to tension the webbing after the web engaging device is moved from the open condition to the engaged condition. In one embodiment, the tensioner is configured to tension the webbing after a predetermined time measured from when the web engaging device is toggled from the open condition to the engaged condition or, in one embodiment, from when the web engaging device is toggled from the engaged condition to the open condition. In a preferred embodiment, the tensioner is configured to tension the webbing to a tension taken from at least one of a preset tension and a user specified tension. In one embodiment, the system further includes a tension detector operably engaged with the vehicle occupant restraint system to detect an indicia of tension in the webbing. The tension detector may include, in one embodiment, at least one of a tensiometer, a strain gauge, a resistor wire embedded in the webbing, a webbing deflection detector, a spring-loaded mechanical switch, a pressure applicator applied to the webbing, a sonic detector, an ultrasonic detector, an optical detector, a strain gauge, an ammeter, etc. In one embodiment, the tensioner is coupled to the tension detector and configured to de-activate upon the detection by the tension detector of a predetermined indicia of tension in the webbing. For example, in one embodiment, the tension detector is configured to de-activate the tensioner after a predetermined indicia of tension is reached in the lap belt portion. In one embodiment, a means of measuring belt tension in a seat belt system includes a moveable pressure applicator located on one side of a web portion and two protrusions located on an opposite side of the web portion, one each of the protrusions located on either side of a moveable pressure indicator along a length of the belt.

In one embodiment, in a system that includes a three three-point continuous loop restraining device having a tongue plate, a buckle, webbing with a shoulder portion and a lap portion, a web engaging device coupled to the three-point continuous loop restraining device on the shoulder belt portion and proximate the tongue plate, the web engaging device being toggleable from an open condition that permits the passage of the webbing through the web engaging device in two directions and an engaged condition that restricts the passage of the webbing through the web engaging device in at least one direction, there is a method of securing an occupant that includes automatically toggling the web engaging device to the engaged condition in response to a buckling of the tongue plate to the buckle. In one embodiment, the method includes automatically tensioning the webbing in response to the detection of a loosened condition in the lap belt portion. In one embodiment, the method includes toggling the web engaging device to the open condition and automatically tensioning the webbing after a predetermined period of time measured from a detection of the toggling in response to the toggling the web engaging device to the open condition.

BRIEF DESCRIPTION OF THE DRAWINGS

FIG. 10B is an exploded view of the embodiment of the invention shown in FIG. 10A;

DETAILED DESCRIPTION

Reference will now be made in detail to embodiments of the present invention, examples of which are illustrated in the accompanying drawings. To provide a thorough understanding of the present invention, numerous specific details of the embodiments are set forth herein. Some of those details may be eliminated in practice without departing from the spirit of the invention. In other instances, well-known devices, methods, and processes have not been described in detail to avoid obscuring the invention.

The present invention will be described in the context of a three-point continuous loop seat belt system and associated devices that help restrain the movement of a child seat in an automobile or an occupant of an automobile. However, it will be appreciated by those skilled in the art that the subject invention may be advantageously employed to provide a means for securing occupants in other belt systems of various types and in vehicles (including trucks, aircraft, heavy construction equipment, and military ground vehicles) of various types. Thus, the invention has broad applicability beyond the specific automobile seat belt system described herein.

The present invention will also be described in the context of original equipment and aftermarket (retrofit) embodiments. In the original equipment embodiments, elements of the invention are fabricated integrally with a seatbelt. In the case of the add-on/retrofit versions, they are designed to attach to a factory-installed (pre-existing) seatbelt without the need to disassemble or modify the existing seatbelt.

Last, the present invention will be described in the context of manual virus automated, whereby all the functions of the invention can be activated or caused to be activated manually, or mechanical devices and/or control systems can be used to perform some or all of the function in an automated (e.g., no user intervention required) mode.

Figure 1A:
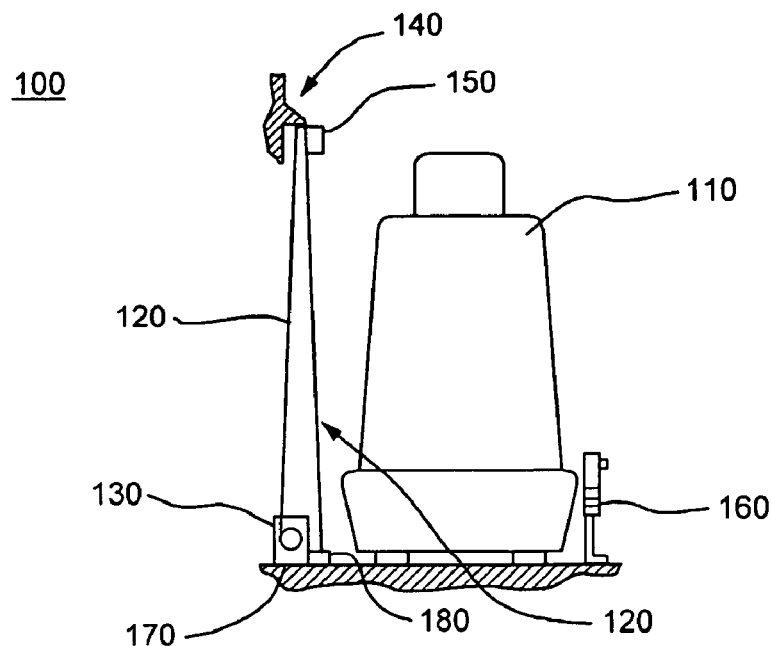
FIG. 1A depicts an embodiment of a typical, factory-installed, three-point, continuous loop seat belt system as found in most modern automobiles, in the retracted position.

FIG. 1A depicts an embodiment of a typical, factory-installed, three-point, continuous loop seat belt system 100 as found in most modern automobiles, in the retracted position. The seat belt system 100 of FIG. 1A includes, an automobile seat 110, a length of seat belt webbing 120, a seat belt retractor 130, a D-ring 140, a tongue assembly 150, and a buckle 160. During the operation of an automobile, the occupant of the automobile sits on the automobile seat 110, illustratively a front passenger seat, and is typically restrained in the seat 110 by a seat belt system as the system 100 depicted in the FIG. 1A. A first end 121*a* of the length of seat belt webbing 120 is anchored to the automobile body 170 at an anchor point 180 located to one side of the automobile seat 110. A second end 121*b* of the belt webbing 120 is attached to the seat belt retractor 130, which is secured to the automobile body 170 on the same side of the automobile seat 110 as the anchor point 180 so that the anchor point 180 is positioned between the seal belt retractor 130 and the automobile seal 110. Intermediate to its ends 121*a* and 121*b*, the seat belt webbing 120 passes through the tongue assembly 150 (as exemplified in FIG. 2) and through the D-ring 140, which is located above the seat belt retractor 130 and the anchor point 180. When the seat belt system 100 is not in use (i.e., in its stowed condition) the excess belt webbing 120 is typically rewound by the seat belt retractor 130 and is orientated generally vertically on the one side of the automobile seat 110, as depicted in FIG. 1A.

Figure 1B:
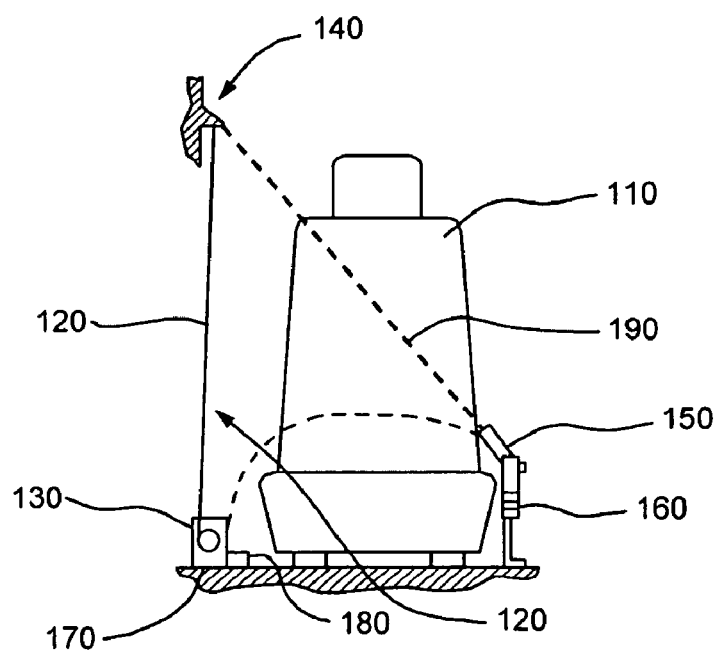
FIG. 1B depicts the seat belt system of FIG. 1A in the engaged position.

FIG. 1B depicts the seat belt system 100 of FIG. 1A in the engaged position. To engage the seat belt system 100, the tongue assembly 150 is manually grasped and is pulled across the lap and torso of the occupant sitting in the automobile seat 110. As the tongue assembly 150 is pulled across the lap and torso of the occupant, the tongue assembly 150 slides freely along the length of the belt webbing 120, and the belt webbing 120 is unwound under (e.g., against) mild tension from the seat belt retractor 130. When the belt webbing 120 has been pulled across the lap and torso of the occupant, the tongue assembly 150 is engaged with the buckle 160. The buckle 160 is anchored to the automobile body 170 and is disposed to a side of the automobile seat 110 opposite the anchor point 180. When the seat belt system 100 is buckled or engaged, the length of the belt webbing 120 is divided by the tongue assembly 150 into a shoulder (torso) portion 190, which extends between the D-ring 140 and the engaged tongue assembly 150, and a lap portion 192, which extends between the engaged tongue assembly 150 and the anchor point 180.

It should be noted that any application of tension (such as slowly leaning forward against the seat belt) easily counteracts the mild tension of the seat belt retractor 130 and permits the shoulder portion 190 and/or lap portion 192 to increase in length and thus loosen. Only if the seat belt retractor 130 locks (as it is designed to do under emergency situations) will the seat belt shoulder and lap portions 190 and 192 become of fixed length and thereby restraining.

Figure 1C:
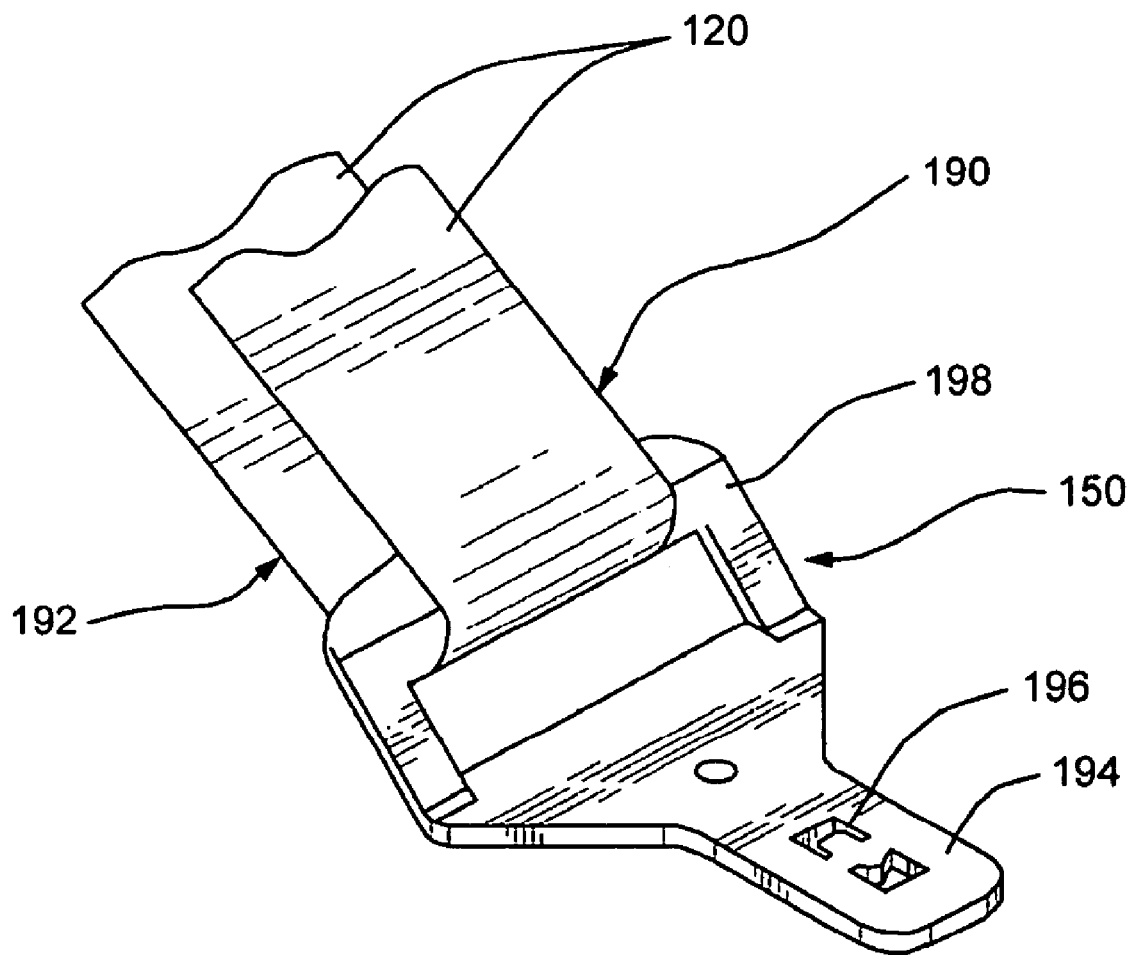
FIG. 1C depicts an embodiment of a tongue assembly suitable for use in the seat belt system of FIGS. 1A and 1B.

FIG. 1C depicts one embodiment of the tongue assembly 150, suitable for use in the seat belt system 100 illustrated in FIG. 1A and FIG. 1B. The tongue assembly 150 comprises a tapered tongue lock plate 194 having at least one locking mechanism 196 formed therein, and a bracket 198 coupled to the lock plate 194. The seat belt webbing 120 passes through the bracket 198 of tongue assembly 150, which separates the continuous webbing 120 into the shoulder portion 190 and the lap belt portion 192. The exact point of separation is variable since the tongue assembly 150 slides freely along the length of the seat belt webbing 120 to facilitate the buckling and stowage of the seat belt system 100.

To engage the seat belt system 100, the tongue assembly 150 is grasped by the occupant, pulled across the occupant's body, unwinding additional seat belt webbing 120 from the seat belt retractor 130 as needed, and subsequently inserted into the buckle 160. The tongue assembly 150 is inserted into the buckle 160 via the tongue lock plate 194, and the at least one locking mechanism 196 engages the buckle 160 to secure the third point of the 3-point seat belt system 100 of FIG. 1A and FIG. 1B. A person of ordinary skill in the art will recognize that many other forms of securement systems having two mating portions could be used in the place of the typical buckle and tongue described.

The present invention represents an advance in safety as it is applied to passenger restraint systems. For example, in one embodiment, improvements in safety are achieved by tensioning webbing before an accident occurs. In one embodiment, the tension in the webbing is selectively applied to a portion of the webbing. In one embodiment, tension in a portion of the webbing (e.g., the lap belt portion) is isolated from tension in another portion of the webbing (e.g., the shoulder belt portion). By tensioning the webbing in advance of an accident, a situation may be avoided where a driver or passenger moves several inches in a collision before the webbing is tensioned thereby further avoiding greater G-forces as a result of the collision and achieving less movement of the occupant's body resulting in no or reduced impacts with the interior of the vehicle. In one embodiment, the present invention promotes the wearing of a passenger restrain system since the passenger can enjoy the comfort of a less tensioned shoulder belt portion while simultaneously being advantaged by a more tensioned lap belt portion.

In one embodiment, the present invention enables vehicle restraint systems to be operated in two conditions. A first condition of one embodiment is characterized by the vehicle restraint system operating so the webbing is substantially free to move through a slip tongue along the length of the webbing (e.g., in two directions) (an open condition). A second condition of one embodiment restricts the movement of the webbing with respect to the slip tongue (e.g., an engaged position). In one embodiment, the second condition is further characterized in that webbing is restricted to movement in substantially only one direction along the length of the webbing. Thus, as described in more detail below, in one embodiment, when the engaged condition is achieved, tension applied to the webbing and released may be retained by the lap belt portion but not the shoulder belt portion.

In one embodiment, the present invention includes a component of a vehicle restraint system that includes a web engaging portion that toggles between the first condition and the second condition. In one embodiment, the web engaging portion includes a cam such as a cam described in U.S. Pat. No. 6,938,925 issued on Sep. 6, 2005 or U.S. Pat. No. 7,185,919 issued Mar. 6, 2007 both of which references are hereby incorporated by reference in their entireties.

An advantage of one embodiment of the present invention is that the component with the web engaging portion may be locked to and unlocked from the first condition characterized by the ability of webbing to move freely with respect to the component (e.g., an open condition). So for example, in an embodiment where the web engaging portion is biased to the second condition (e.g., an engaged condition), a user may override the bias and lock the device in the first condition (e.g., allowing the webbing to move freely through the slip tongue as in the traditional three-point continuous loop seat belt system). Some embodiments of the present invention are adapted such that they include one or more of the following advantages: the vehicle restraint system automatically achieves the second condition when a user buckles a seat belt; the vehicle restraint system automatically reverts to the first condition when a seat belt is unbuckled (e.g., so that a seat belt can be retracted as in a traditional retraction system); a lap belt portion of a seat belt is automatically tensioned in isolation from the shoulder belt portion when a seat belt is buckled; a user may temporarily revert to the first condition (e.g., an open condition) from the second condition (e.g., an engaged position) while a seat belt is buckled (e.g., so that the user can release tension in the lap belt portion to reach for a wallet without disengaging the seat belt buckle); a seat belt is automatically returned to the second condition a certain time after a user temporarily reverts to the first condition; the set belt is re-tensioned after a period of time (e.g., a periodic re-tensioning during operation of a vehicle to ensure the lap belt portion is properly tensioned); a user ordered re-tensioning during operation of a vehicle; and a re-tensioning after a user causes a buckled seat belt to revert to the first condition from the second condition. Other advantages will be apparent from the disclosure contained herein.

FIG. 2 illustrates an embodiment of a restraint system 200 according to the present invention. In one embodiment, restraint system 200 includes a buckle 210, a tongue 215 that is engageable with buckle 210, webbing 220, a component 230 (e.g., a belt cinch) that in one embodiment is coupled to tongue 215 and webbing 220. Webbing 220 is shown as divided into a first portion (e.g., the lap belt portion 221) and a second portion (e.g., the shoulder portion 222). In the embodiment of FIG. 2, webbing web 220 is anchored on the end associated with the lap belt portion 221 of webbing 220, with the opposite end anchored to tensioner 260 (illustrated in FIG. 2 as a worm gear drive supplementing, integrated into, or added to the retractor (See FIG. 1A 130)). Also in the embodiment of FIG. 2, webbing 220 passes through tongue 215 and overhead portion 280, which is anchored to the vehicle in which seat belt system 200 is installed. In some embodiments, system 200 includes tension detector 240.

As described in more detail herein, component 230 may be operated in two conditions such as the engaged and open conditions described above. In the engaged state, a web engaging device of component 230 may engage web 220 such that passage of web 220 is restricted (e.g., to only one direction relative to the component 230). In the disengaged state, web 230 may freely pass through component 230 in either direction along the webbing.

In one embodiment, tongue 215 and component 230 may be a single unit or may be separate units. By way of example, the two devices might be a single unit in an original equipment system and two separate units in an after-market system. However, an original equipment system may also have tongue 215 and component 230 as separate cooperating items.

Automatic retraction of the seat belt into a stowed position eliminates the need for a heavy spring load on the retractor reel, which many occupants find objectionable. The assisted or automatic motor-assisted retraction may be used independently of component 230.

In one embodiment, illustrated again in FIG. 2, system 200 also includes switch 231. In one embodiment switch 231 may include one or more of a mechanical switch (e.g., a push button, a lever such as described in more detail below in connection with the cam/lever in illustrated embodiments), an electronic switch, optical detectors (e.g., a detector such as found in the Check-Line BTM-4000PLUS belt tension meter.), and an electrical continuity detector (e.g., the electrical continuity detector found in Mine Design Technologies Inc.'s Sloughmeter).

In one embodiment, switch 231 may provide a signal for control unit 250 to indicate whether buckle 210 and tongue 215 are engaged with one another. In one embodiment, switch 231 includes a detector 232 that is configured and dimensioned to detect when the buckle 210 engages tongue 215. In one embodiment, sensor 232 may be placed in one or more of buckle 210, tongue 215, or component 230. In the embodiment of FIG. 2, switch 231 is illustrated as being located in component 230. Switch 231 can include any of a number of devices including, but not limited to, a momentary contact switch, a reed switch on either the buckle or tongue used with a magnet on the other of the buckle or tongue, and a rocker switch.

As explained below, switch 231 may provide a signal indicating a change in status in the buckling of buckle 210 to tongue 215. This may trigger a change in the status of worm gear drive 260. Upon sensing that buckle 210 and tongue 215 are engaged, control unit 250 may activate worm gear drive 260 to tighten the seat belt to a predetermined tension, after which control unit 250 may signal worm gear drive 260 to discontinue tensioning or reduce tension. This reduction may or may not be after a preset amount of time has elapsed. Worm gear drive 260 may be powered by an electric motor, pneumatic motor, hydraulic motor, or other mechanism.

One embodiment of system 200 also includes tension detector 240, illustrated in FIG. 2. In one embodiment, tension detector 240 operates to detect an indicia of tension in webbing 220. Indicia of tension may include, for example, the tension in webbing 220, strain in webbing 220 or in another component of system 200, resistance (e.g., in a wire or strain gauge embedded in webbing 220 as a surrogate for tension), deflection (e.g., of webbing 220 in response to a force in a direction perpendicular to the length of webbing 220), sonic response, ultrasonic response, optical response, strain response as indicated on a gauge located on or in mounting hardware (anchors or bolts), ammeter values (e.g., if tensioning performed via a motor or linear actuator), weight (e.g., as sensed in a sensor in the vehicle's seat), and the like. In one embodiment, tension detector 240 includes at least one of a spring-loaded mechanical switch, a pressure applicator applied to the webbing, a sonic detector, an ultra sonic detector, an optical detector, a strain gauge, a piezoelectric device and an ammeter. In one embodiment, for example, an ammeter may be configured and dimensioned to measure current drawn by tensioner 260 (e.g., a tensioning motor). In one embodiment, the measured current may be a surrogate for measuring actual tension in webbing 220 (or any portion thereof) or it may be converted to an actual tension determination. In one embodiment, sensor 240 provides a visible readout. In one embodiment, sensor 240 provides detected tension indicia to control unit 250. In one embodiment, sensor 240 provides substantially continuous readings. In one embodiment, tension detector 240 provides a response when tension reaches a predetermined level. With a sensor that provides a response when tension reaches a predetermined level, there may be a user adjustment to the predetermined level to account for, e.g., occupants of different sizes and weights.

Figure 2A:
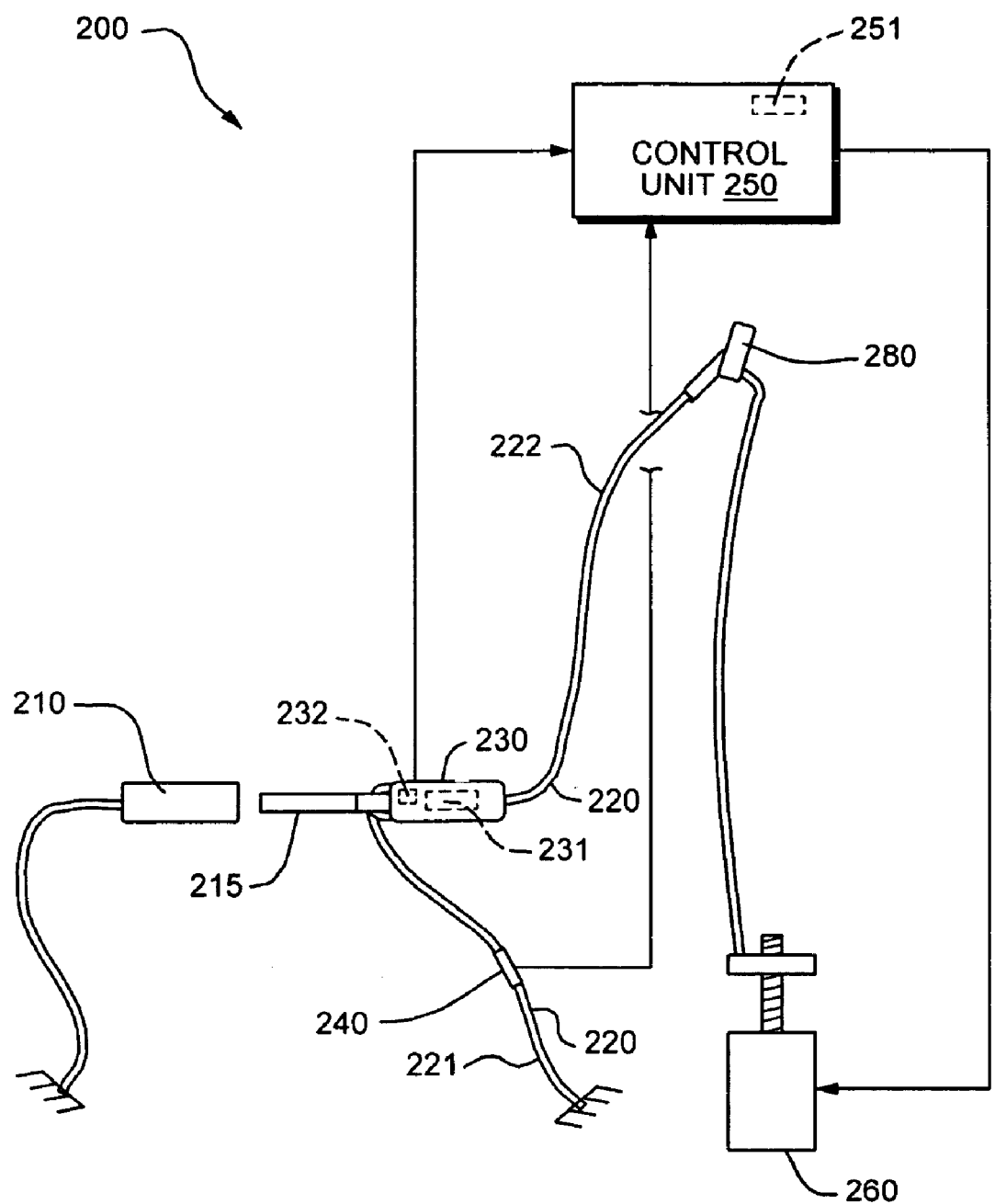
FIG. 2A depicts a system for increasing safety according to the present invention.
Figure 2B:
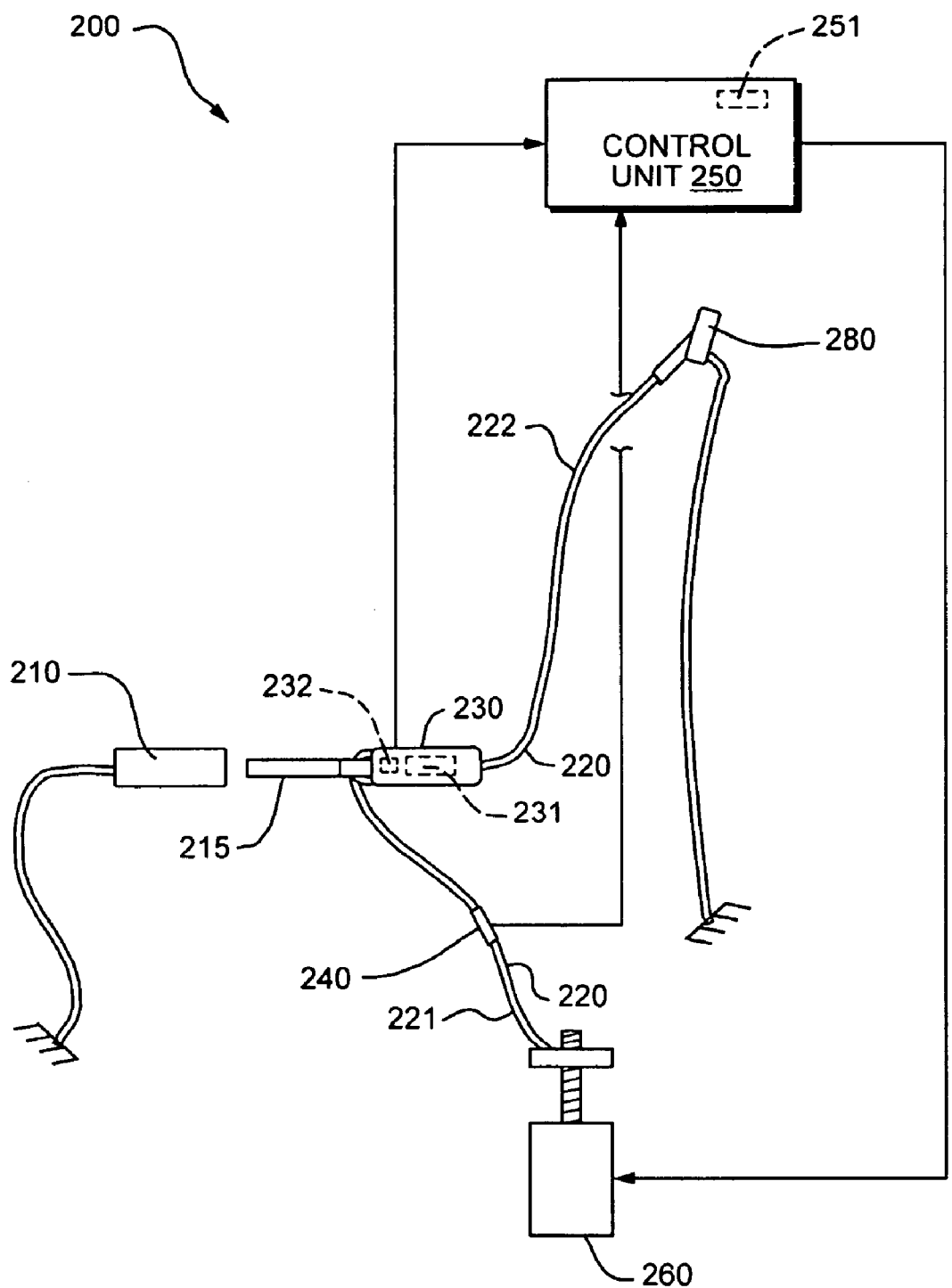
FIG. 2B depicts a variation of the system shown in FIG. 2A.

In one embodiment, illustrated in FIGS. 2A and 2B, tension detector 240 is located on lap belt 221, but it may also be included on the shoulder portion 222 of seat belt 220, within buckle 210, within tongue 215, within tensioner 260, at an anchor, at a retractor, at a "D" ring and/or any other location that might produce a response that is indicative of the tension in webbing 220 (e.g., in lap belt portion 221 or shoulder portion 222).

Figure 35:
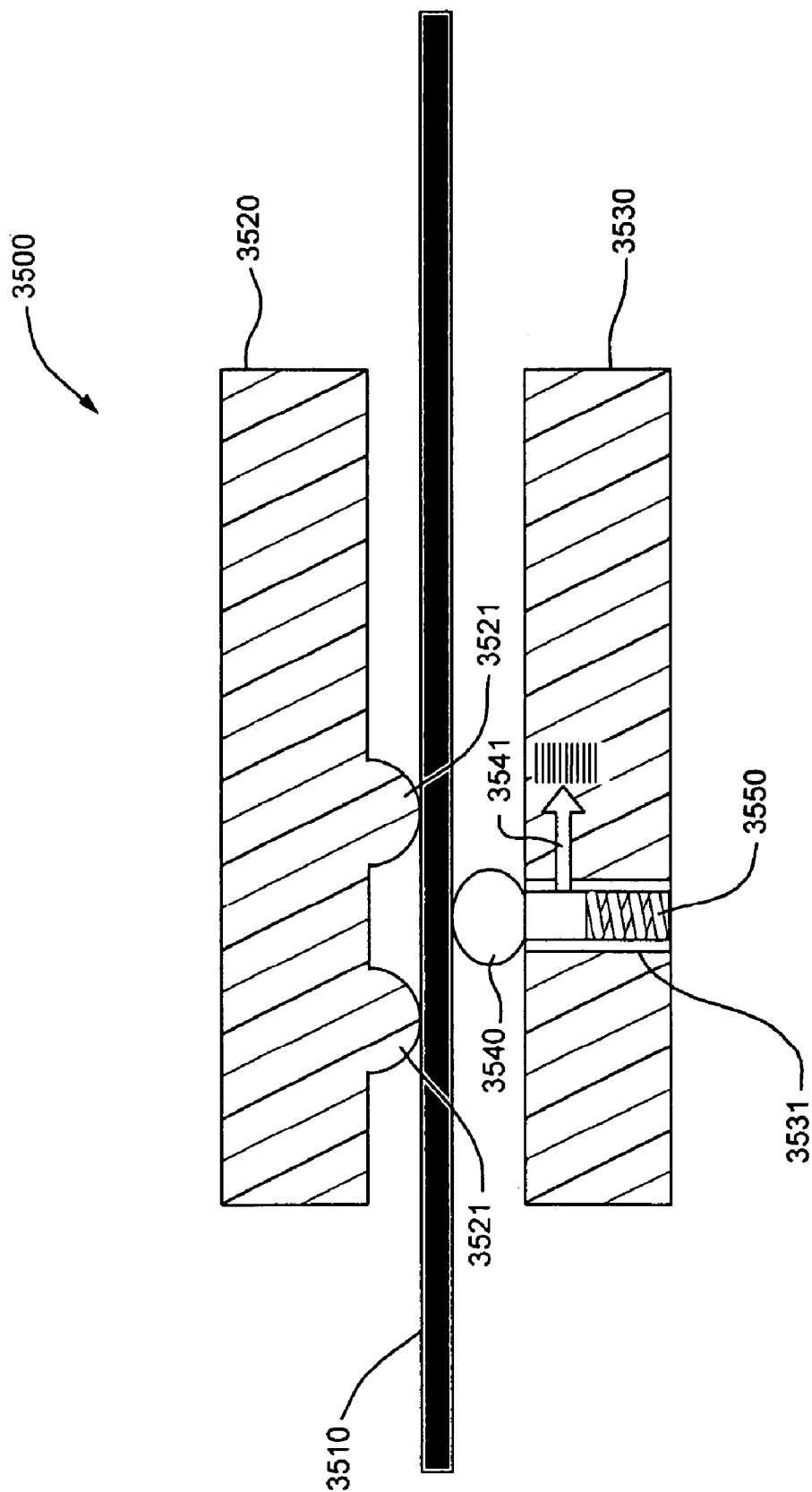
FIG. 35 is a section view of a seat belt web tension detector according to another embodiment of the invention.

FIG. 35 shows one embodiment of a mechanical seat belt tension detector 3500. In one embodiment seat belt web 3510 is run between an upper portion 3520 and lower portion 3530 of tension detector 3500. Protrusions 3521 are on the upper portion 3520 and movable pressure applicator 3540 is located on the lower portion 3530 between protrusions 3521 along the length of seat belt web 3510. Spring (or other suitable biasing device) 3550 and a lower portion of pressure applicator 3540 rest within cavity 3531 of lower portion 3530. In practice, in one embodiment, spring 3550 exerts an upward pressure deflecting the webbing upwards and causing protrusion 3540 to also rise upwards. When the webbing 3510 is under some degree of tension, webbing 3510 forces protrusion 2540 to be deflected downwards. In one embodiment, that deflection is measured as an indicia of tension in webbing 3510. In one embodiment, the deflection is proportional to tension in webbing 3510. In one embodiment, from the difference in protrusion 3540 height, an indicia of tension can be determined.

Increasing tension on webbing 3510 results in pressure applicator 3540 exerting more force against spring 3550. As shown, this results in needle 3541 moving to indicate tension. Alternatively, pressure applicator 3540 could move a potentiometer or other device that could be used to input a pressure to a control system.

In one embodiment (FIGS. 2A and 2B), system 200 includes control unit 250. Control unit 250 includes a processor that receives and/or sends signals from and/or to one or more components of system 200. In one embodiment, control unit 250 receives a signal from tension detector 240. In one embodiment, that signal can be used to ensure lap belt portion 221 meets a desired tension condition. In one embodiment the desired condition may be a tightness of lap belt portion 221 that is selected in advance (e.g., in the factory for OEM applications, by a user who selects tightness prior to or after a seat belt is worn). In other embodiments, the desired condition is a tightness that is selected during tightening of webbing 220. In embodiments where the desired tightness is selected during tightening it is preferable to preselect a maximum tightness to ensure the safety of a user. In one embodiment, the desired condition is the engaged or open condition of component 230.

In one embodiment, when tongue 215 engages buckle 210, switch 231 is activated. In one embodiment, that activation is manual and in another embodiment, that activation is in automatic response to the buckling. In one embodiment, the activation of switch 231 causes component 230 to toggle into the engaged position, causes tensioner 260 to tension webbing 220 or both.

For example, in one embodiment, activation of switch 231 causes a signal to be sent to control unit 250 (e.g., via detector 232) indicating that that webbing 220 is ready for tensioning. Control Unit 250 may then send a signal to tensioner 260 to begin tensioning webbing 220. In one embodiment, webbing 220 is then automatically tensioned until a preferred tension is reached such as described above. In one embodiment, the activation of switch 231 causes component 230 to toggle to the engaged position so that webbing 220 can be manually tensioned. In one embodiment, whether the tensioning is manual or automatic, once the tensioning force is discontinued (e.g., in response to a signal from tension detector 240 or by user who judges the tension to be sufficient), the lap belt portion 221 remains tensioned while the shoulder belt portion 222 is free to accept slack.

By way of further example, in one embodiment, switch 231 may be activated (automatically or manually) when tongue 215 disengages from buckle 210. In one embodiment, the activation of switch 231 upon disengagement of buckle 210 from tongue 215 causes component 230 to achieve the open condition automatically (described in more detail below). In one embodiment, when switch 231 is activated upon unbuckling, a signal is sent to control unit 250 that has the effect of discontinuing tensioning commands until the system is buckled.

In some embodiments (including some of those described in more detail herein), system 200 may be toggled from the engaged position to the open condition when the system is buckled. In one embodiment, toggling is achieved by activating switch 231 (e.g., manually activating switch 231). In one embodiment, activating switch 231 to achieve the open condition causes sensor 232 to send a signal to control unit 250. In one embodiment, in response to that signal, control unit 250 would start a timer 251. After a predetermined delay, control unit 250 may then restore the desired tension in the lap belt portion by signaling tensioner 260 to tension webbing 220. That switch or other activator could be controlled by the tension detector in any of its possible forms. In one embodiment, any loosening of lap belt portion 221 while the system is in a buckled state would result in a signal to control unit 250 to tension webbing 220.

Even in a system without control system 250, switch 231, and tension detector 240, web tensioning can be done either manually or automatically. For manual tensioning, a wearer could simply, while component 230 is in the engaged position, pull on shoulder portion 222 to shorten—and consequently tighten—lap belt portion 221. For automatic tensioning, a belt retractor device may put a tension on the shoulder portion such as to pull on shoulder portion 222 so as to tighten lap belt portion 221. In either event, a ratchet-like action of one component 230 maintains the lap belt portion 221 tight, while a wearer is still able to move against the tension on shoulder portion 222.

Component 230 may be configured so that a user may loosen (in some cases temporarily) lap belt portion 231 (e.g., for access to a back pocket). In one embodiment, a user may manually engage switch 231 by operating a lever or button biased by a spring toward the engaged position. The user may move the lever or button long enough to perform the activity for which the loosened state is desired (Note that this should only be done while a vehicle is at rest to avoid the wearer putting himself in danger.) In one embodiment, sensor 232 may detect that component 230 is in the open condition when the restraint is buckled and provide a signal to control unit 250 (e.g., to start timer 251 or another time associated with tensioner 260) so that web tensioning can commence after a preset delay is complete. Tension detector 240 may further act as a limit switch providing a signal to control unit 250 to stop tensioner 260 when the desired tension is reached.

System 200 can be provided in both original equipment and after-market versions. An original equipment version may have component 230 integral with tongue 215. In one embodiment, an after-market version of component 230 is configured and dimensioned to be readily secured to the web without disassembling any portion of seat belt system 200. In one embodiment, component 230 is configured and dimensioned to be operably coupled to a vehicle passenger restraining device without the use of tools.

Figure 36:
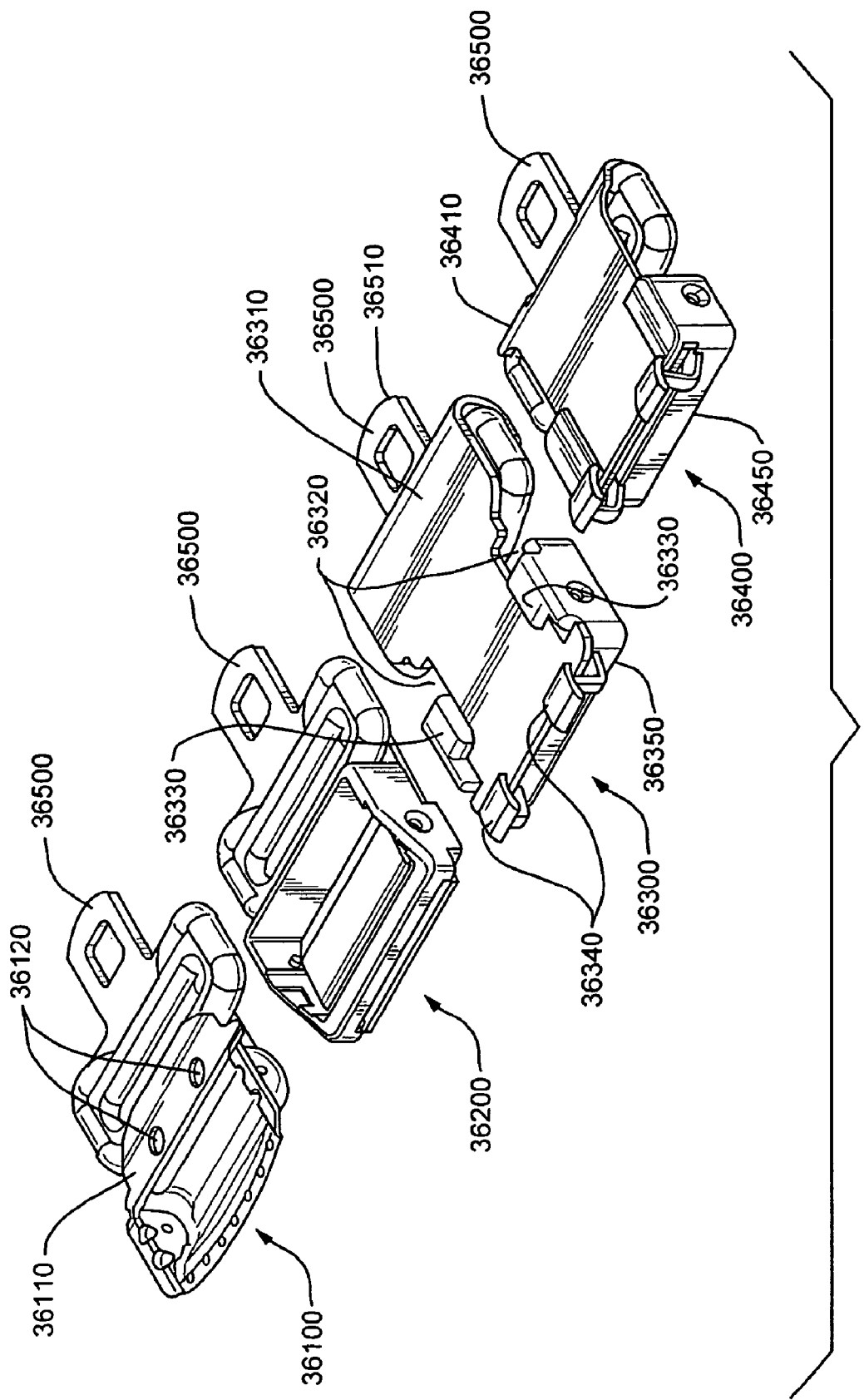
FIG. 36 shows various means of attaching a component according to the present invention to a seat belt tongue.
Figure 37:
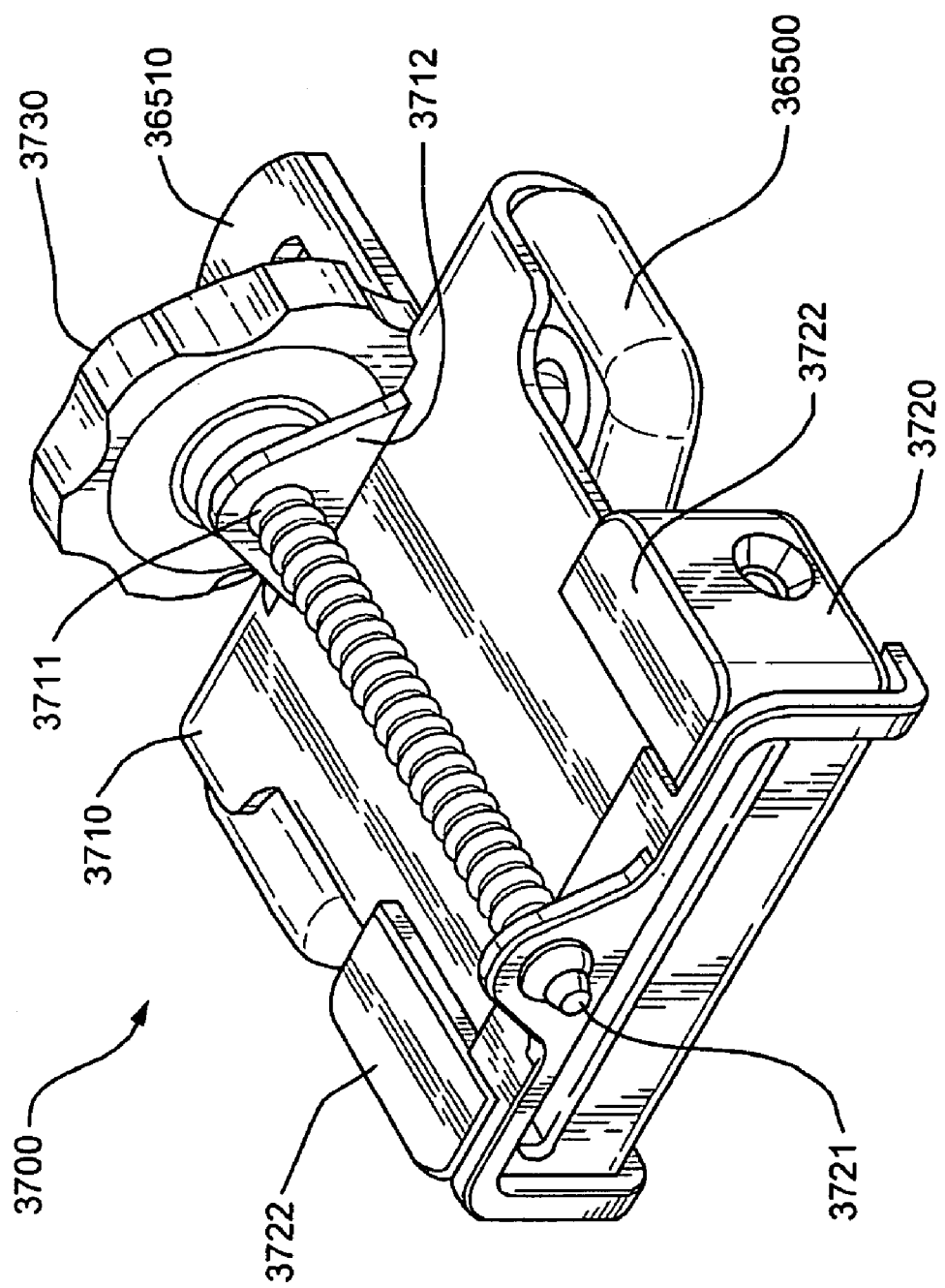
FIG. 37 shows another means of attaching a component according to the present invention to a seat belt tongue.
Figure 38:
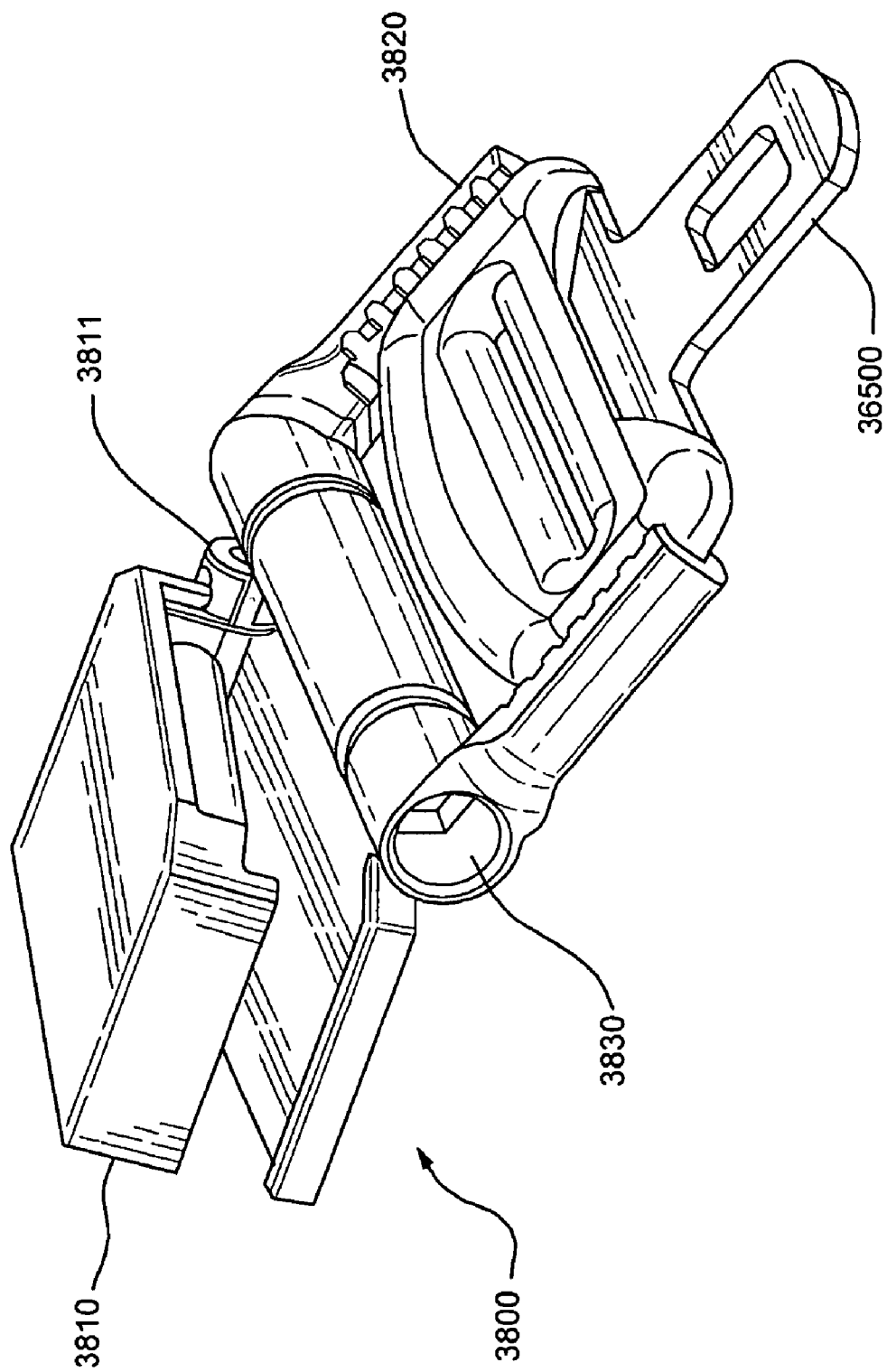
FIG. 38 shows another means of attaching a component according to the present invention to a seat belt tongue.

As described in more detail below, component 230 is attachable to a vehicle passenger restraining system in a variety of ways. In one embodiment, component 230 may be attached to a vehicle passenger restraint system by first placing web 220 within a portion of a first portion of component 230 and then securing a second portion of component 230 to the first portion so as to surround web 220. In one embodiment, component 230 may be so attached to surround tongue 215 thereby coupling component to 230 to tongue 215. In other embodiments, component 230 is attached to tongue 215 using elastic bands, screws, adhesives, rivets, etc. as illustrated in FIGS. 36-38 and explained below.

In one embodiment, an original equipment component 230 allows for flexibility in the construction of the device. In one embodiment, original equipment component 230 engages web 220 by threading web 220 through component 230 (e.g., as opposed to using a split device to be assembled around web 220 as may be the case with an after-market device).

The following examples of component 230 are only exemplary and not limiting.

Figure 3A:
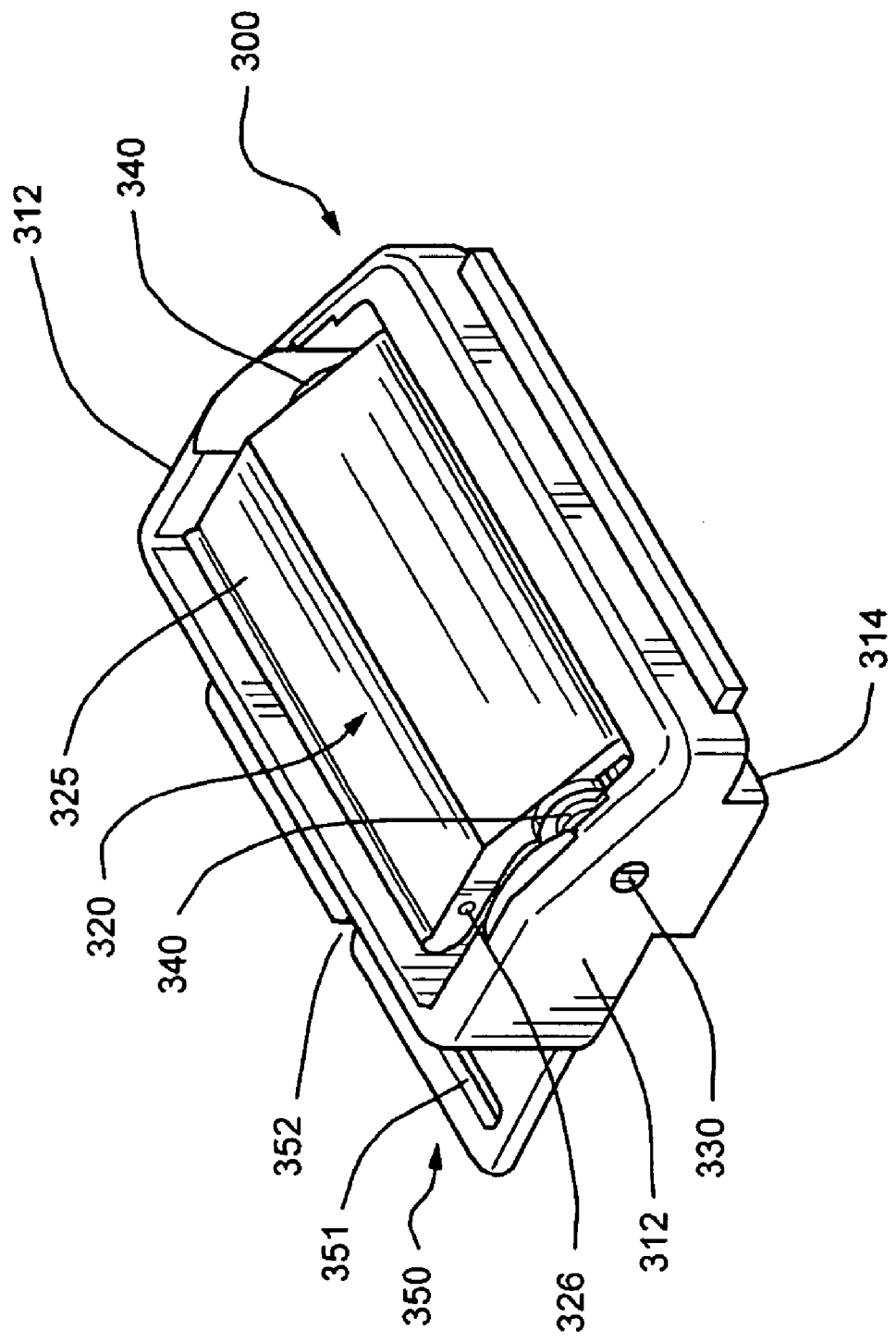
FIG. 3A is a perspective view of an embodiment of the present invention.
Figure 3B:
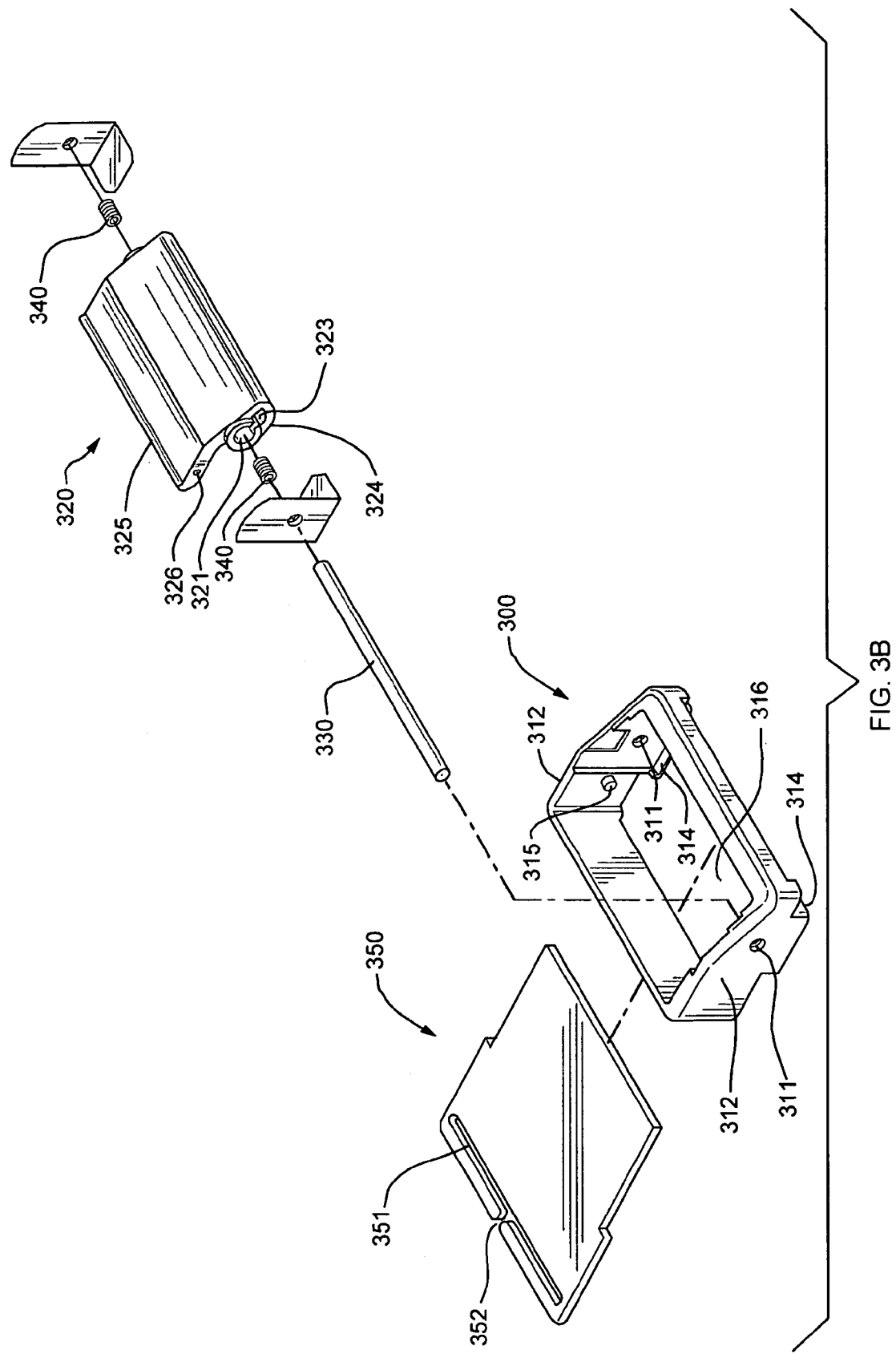
FIG. 3B is an exploded view of the embodiment of the invention depicted in FIG. 3A.
Figure 3C:
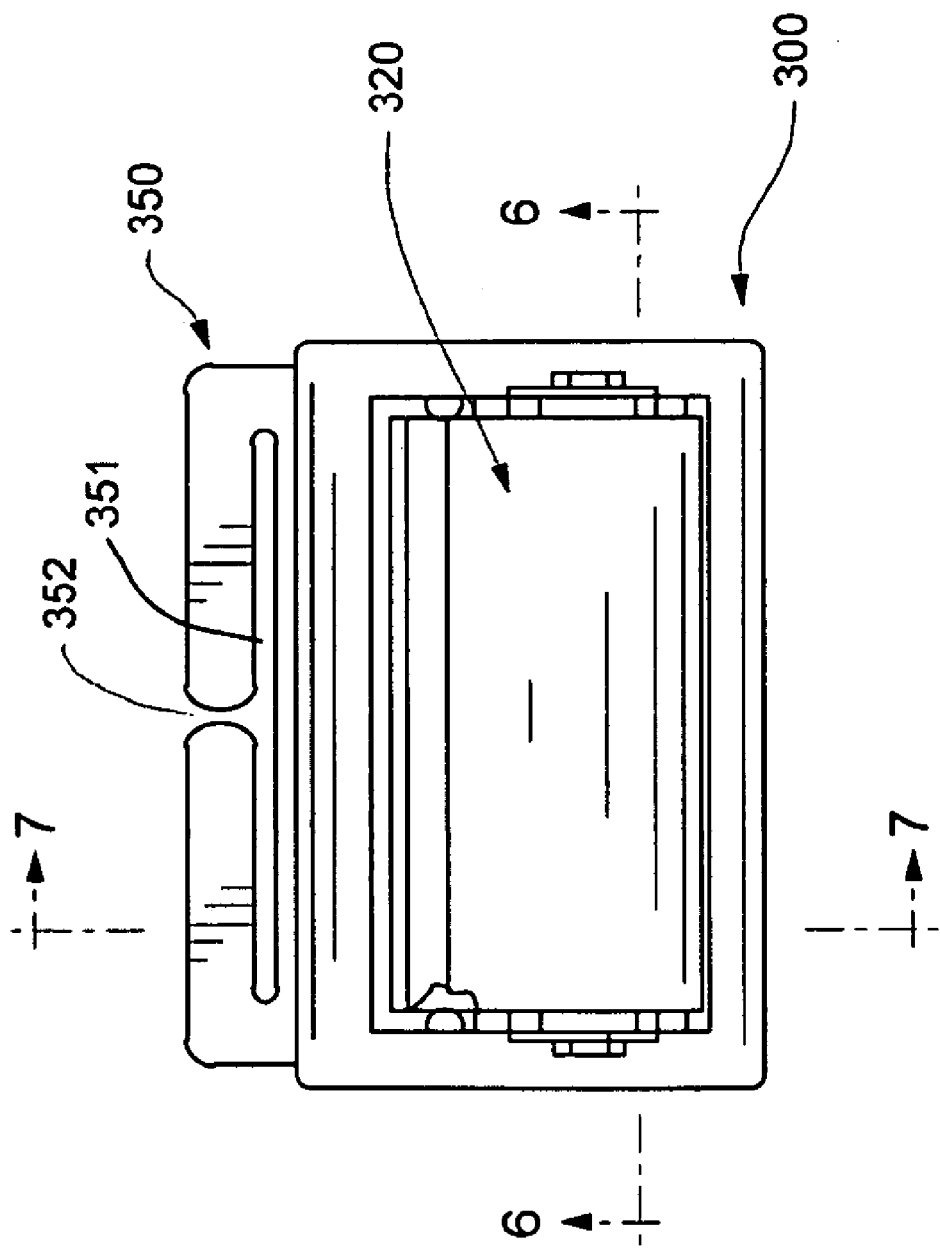
FIG. 3C is a plan view of the embodiment of the invention depicted in FIG. 3A.

FIGS. 3A-9 depict an embodiment of the component 300. Component 300 includes a body 310, a web engaging device in the form of web engaging device 320, a pin 330, one or more torsion springs 340, and a base 350. While the embodiment of FIG. 3 is useful in original equipment embodiments, it is particularly useful for after market installation.

Figure 5:
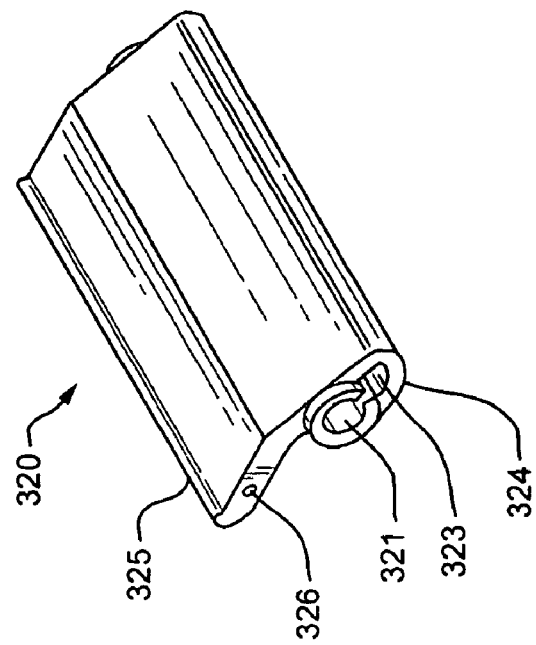
FIG. 5 is a perspective view of a web engaging device of the embodiment of the invention depicted in FIG. 3A.

In one embodiment such as that illustrated in FIGS. 3A-9, body 310 is preferably configured to be slightly wider than the webbing 220 onto which the component 300 will be installed in order to allow passage of webbing 220 through body 310. In one embodiment, body 310 may be in the shape of an open roughly rectangular shaped frame with opposing sides 312 defining at least a part of interior 316. As shown in the figures, body 310 may have coaxial through holes 311 on opposing sides 312. As shown in FIG. 5, web engaging device 320 (illustrated as a cam/lever unit) may have a through hole 321 which, when the component 300 is assembled will be coaxial with holes 311 of body 310. Body 310 is configured and dimensioned to couple with web engaging device 320 such that web engaging device 320 is pivotable relative to body 310 in interior 316. In one embodiment, web engaging device 320 is accessible to a user when component 300 is assembled and operable in connection with a vehicle passenger restraining device.

In one embodiment, component 300 includes a web engaging device 320 having web engaging surface 325 and a switch. In one embodiment, the web engaging surface is located on a cam and the switch is in the form of lever arm 325 extending from the cam such as is illustrated in FIG. 5. The web engaging device illustrated in FIG. 5 is referred to as a cam/lever unit. In one embodiment, the web engaging device 320 is of unitary construction (e.g. the cam and the lever arm are of one piece).

Figure 7A:
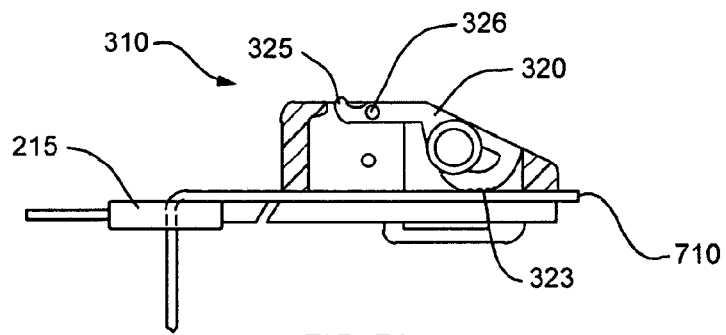
FIG. 7A is a view of the embodiment of the invention depicted in FIG. 3A (used with a single loop tongue) taken through section VII of FIG. 3C.
Figure 7B:
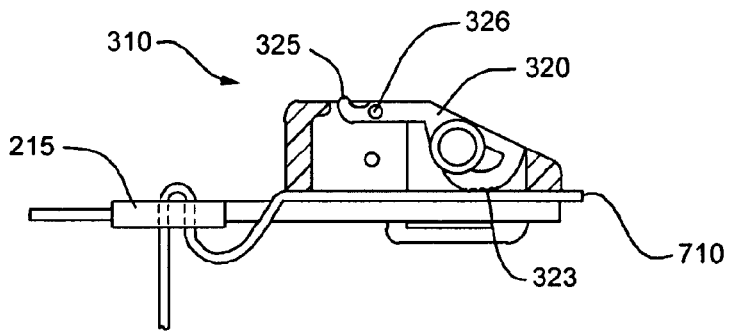
FIG. 7B is a view of the embodiment of the invention depicted in FIG. 3A (used with a double loop tongue) taken through section VII of FIG. 3C.
Figure 8:
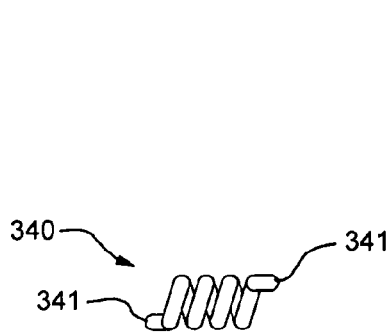
FIG. 8 is a detail of a spring used with the embodiment of the invention depicted in FIG. 3A.

In one embodiment, web engaging device 320, is preferably slightly narrower than the inside dimension between opposing sides 312. In one embodiment, web engaging device 320 fits snugly between opposing sides 312. In one embodiment, pin 330 may be approximately equal to the width of body 310 across the outer portions of sides 312 to allow pin 330 to maintain web engaging device 320 such that it is free to rotate in a plane parallel to sides 312. In one embodiment, a biasing device illustrated in FIG. 6 as torsion springs 340 are configured and adapted to bias web engaging device 320 in a position relative to body 312. In one embodiment, torsion springs 340 are maintained around pin 330 in recessed areas 322 of web engaging device 320, which may be coaxial with through hole 312. In the embodiment shown in FIG. 6, torsion springs 340 are adapted to bias web engaging device 320 in a clockwise direction such that a web engaging surface 323 (illustrated as a knurled surface though other surface to maintain frictional or other contact with seat belt webbing may be used) of web engaging device 320 comes into contact with belt webbing 710 (shown in FIGS. 7A and 7B). As shown in FIG. 8, torsion springs 340 may have segments 341 roughly parallel to pin 330 to engage indentations (not shown) on surfaces of sides 312 of body 310 and/or web engaging device 320 in order to impart the biasing force to rotate web engaging device 320 such that web engaging surface 323 of web engaging device 320 comes into contact with seat belt webbing (not shown).

One embodiment of a method for installing component 300 will now be described. Before installation of component 300 on belt webbing 710, web engaging device 320 may be placed between sides 312 of body 310 with torsion springs 340 within recessed areas 322 of web engaging device 320. Upon aligning through hole 321 of web engaging device 320 with coaxial through holes 311 of body 310, pin 330 may be inserted to retain web engaging device 320 within sides 312 of body 310. Segments 341 of spring 340 may then seat within indentations on opposing sides 312 of body 310 and/or web engaging device 320. The partially assembled component 300 may then be placed on webbing 710 with knurled surface 322 facing webbing 710.

Figure 4:
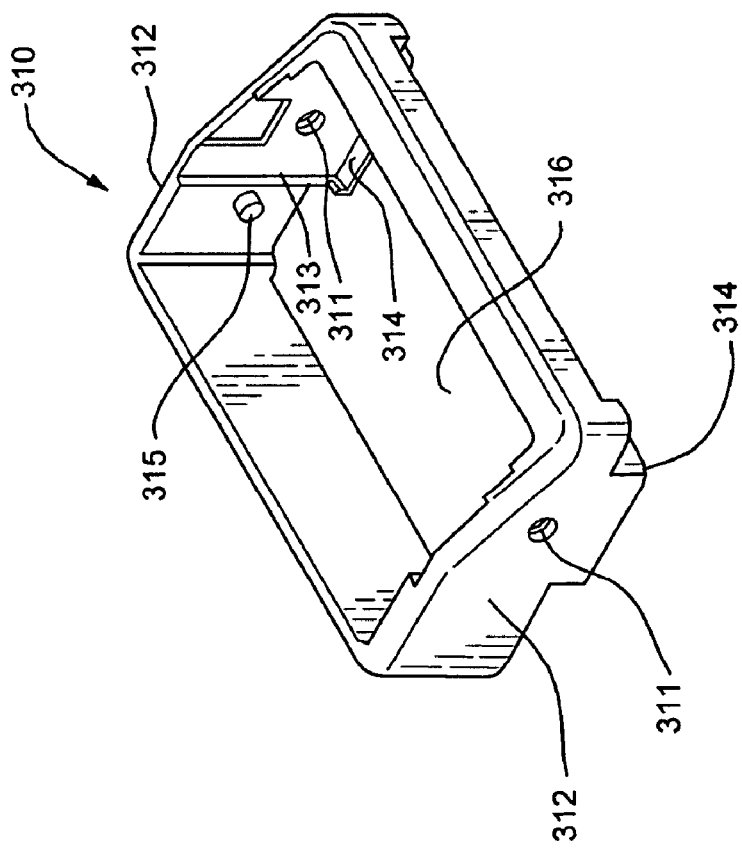
FIG. 4 is a perspective view of the body of the embodiment of the invention depicted in FIG. 3A.
Figure 6:
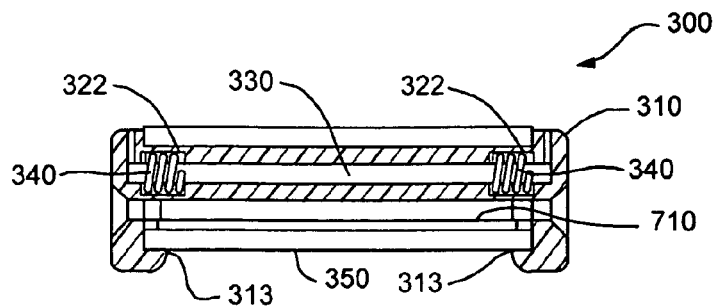
FIG. 6 is a view of the embodiment of the invention depicted in FIG. 3A taken through section VI of FIG. 3C.
Figure 9:
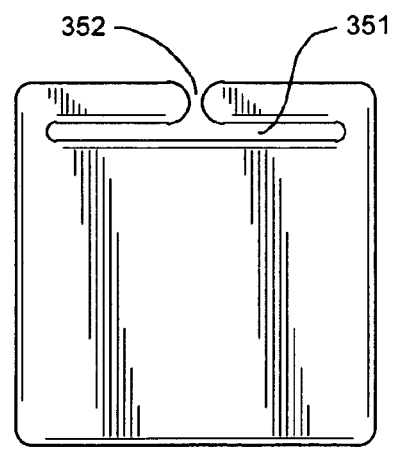
FIG. 9 is a detail of a base used with the embodiment of the invention depicted in FIG. 3A.
Figure 10A:
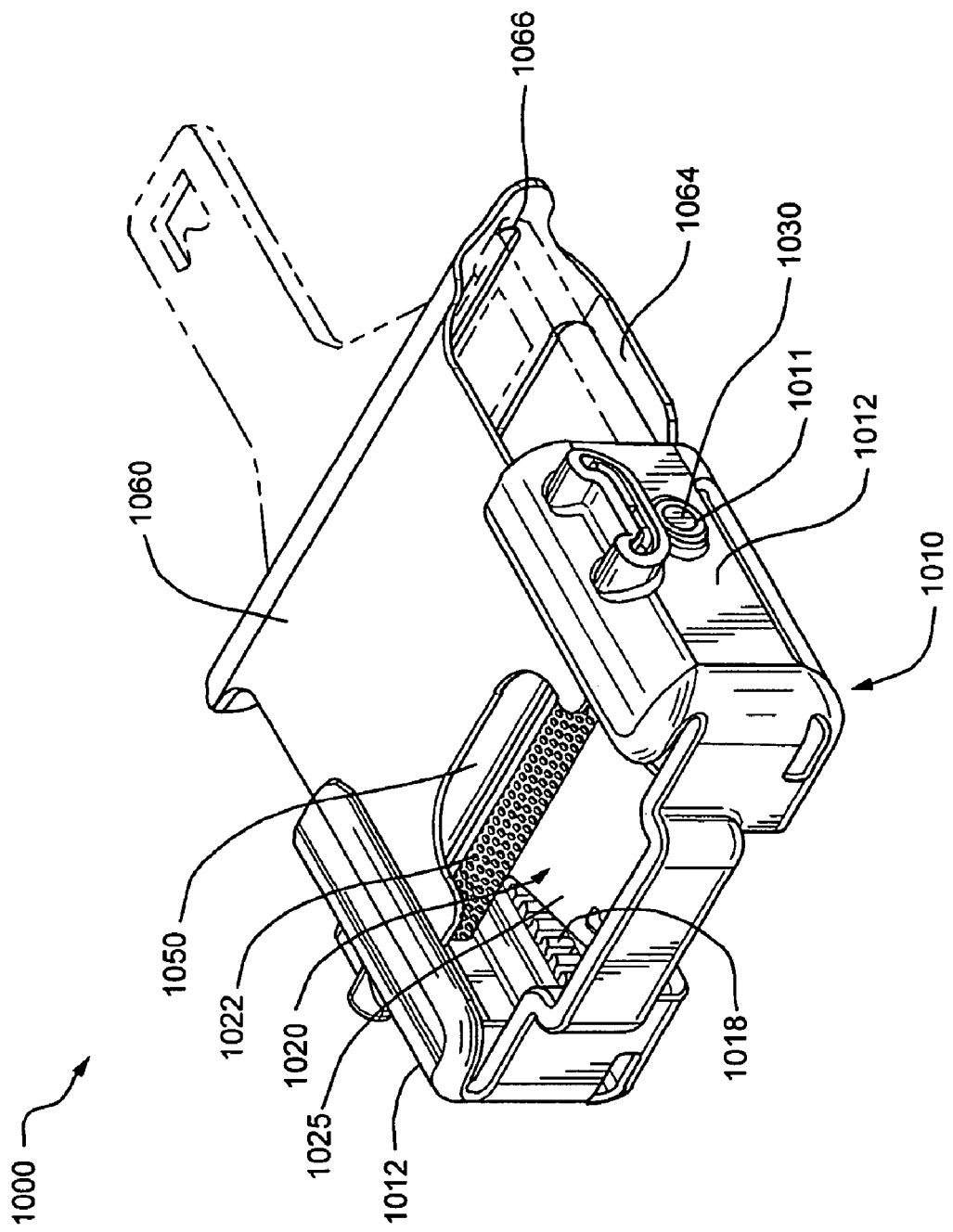
FIG. 10A is a perspective view of another embodiment of the invention.
Figure 11:
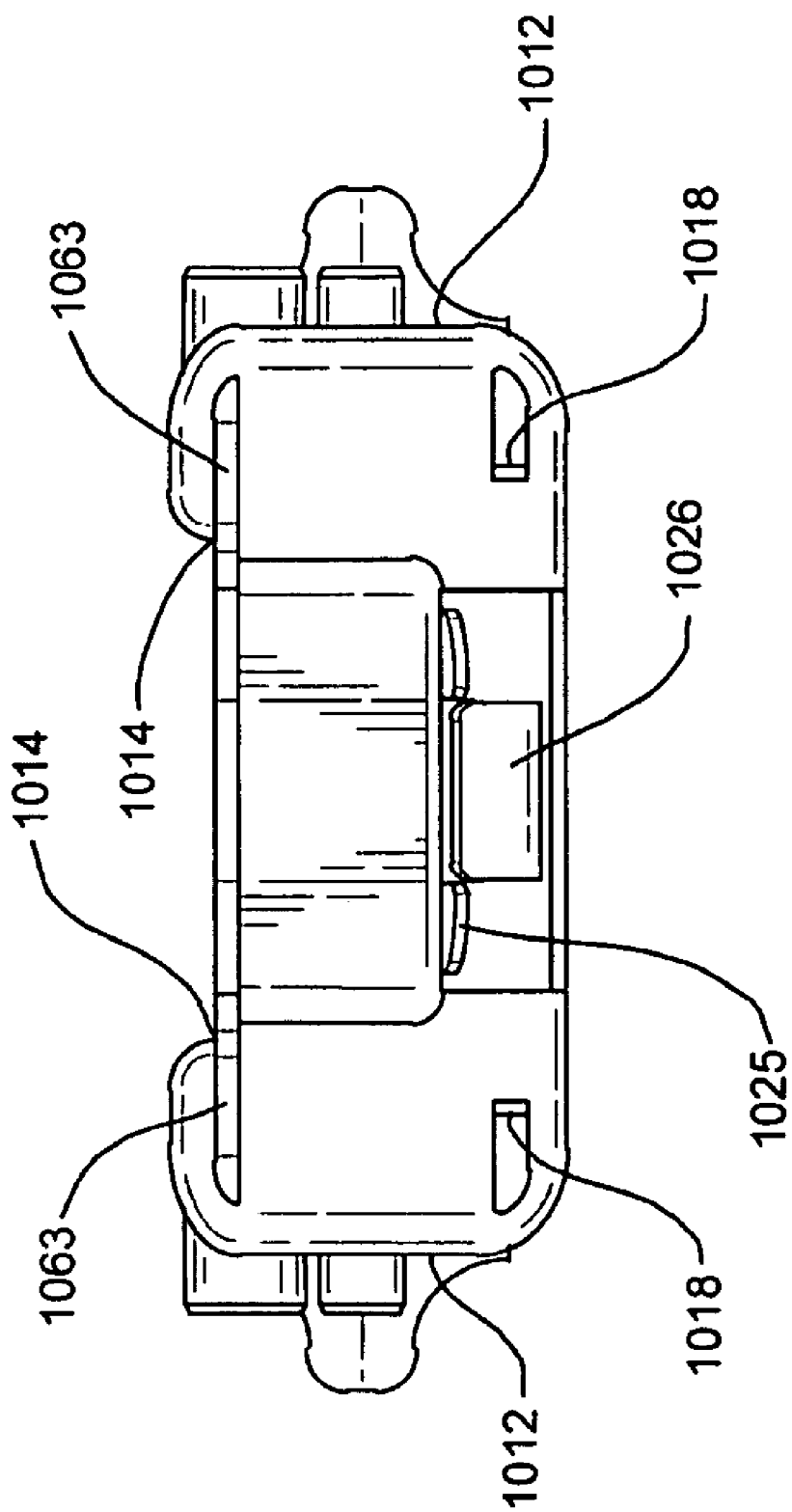
FIG. 11 is an end view of the embodiment of the invention depicted in FIG. 10A.

Base 350, shown in FIG. 9, may be fabricated of metal, plastic, or any suitable rigid material. In one embodiment, base 350 is adapted to couple with body 310 to define a housing that encloses web engaging device (e.g., web engaging device 320). In one embodiment the housing defined by body 310 and base 350 is an at least partially open housing allowing a user to access the web engaging device within the housing when component 230 is operated. In one embodiment, body 310 has slot 351 (FIG. 9). In one embodiment, belt 710 may be inserted into slot 351 (e.g., through opening 352) of base 350 before base 350 is coupled to body 310. In one embodiment, for example, base 350 is coupled to body 310 by sliding base 350 into grooves 313 (FIGS. 3B, 4, and 6). In one embodiment grooves 313 are defined at least in party by protuberances 314 of body 310. As illustrated in FIGS. 6, 7A, and 7B base 350 is coupled to body 310 such that base 350 is disposed on an opposite side of belt 710 than is web engaging device 320. Embodiments of component 230 such as component 300, are preferably installed such that slot 310 is oriented proximate slip tongue 215 so that component 230 is coupled to slip tongue 215 (e.g., as illustrated in FIGS. 7A and 7B). In one embodiment, the friction developed between belt 710, and slot 351 restricts casual sliding in a direction away from slip tongue 215 and the proximity of slip tongue 215 to component 230 substantially preventing sliding along belt 710 toward tongue 215.

FIGS. 7A and 7B illustrate one embodiment of component 230 in an engaged position. FIG. 7A shows the embodiment used with a single loop tongue and FIG. 7B shows the embodiment used with a double loop tongue. In one embodiment, bias elements urge component 230 to be configured in the engaged position. It will be noted in FIGS. 7A and 7B that web engaging device 320 is configured and dimension to urge belt 710 against base 350 when the belt 710 is pulled in a direction toward slot 351 (See FIG. 9) and tongue 215, thus preventing the movement of belt 710 in the direction of tongue 215. Also as will be apparent in view of FIGS. 7A and 7B, when belt 710 is pulled in a direction away from tongue 215, web engaging device 320 rotates counterclockwise to permit belt 710 to slip through component 230 in one direction along the webbing.

As shown in FIG. 7A, web 710 may not go through slot 351 of base 350 when component 300 is used with a single loop tongue. As shown in FIG. 7B, web 710 may go through slot 351 of base 350 when component 300 is used with a double tongue loop.

In the embodiment of FIGS. 7A and 7B, to release tension on webbing 710, a user may depress lever portion 325 of web engaging device 320 such that web engaging device 320 moves in the counterclockwise direction and hold it so that knurled portion 322 of web engaging device 320 is moved clear of webbing 710, allowing webbing 710 to move freely within component 300 (in the open condition).

In one embodiment, component 300 may be locked in the open condition by pushing web engaging device 320 until dimples 326 on web engaging device 320 are engaged by bumps 315 on body 310. Other configurations to lock web engaging device 320 in the open position will be described herein.

In one embodiment, component 300 may be screwed onto the tongue through holes in base 350, clamped onto the tongue by a backing plate with holes to match those of base 350, or it may simply be left on the web so that it is easy to install and remove (e.g., without tools). This would be especially useful for those driving rental cars, driving instructors, and others who drive more than one car.

This embodiment is only exemplary and many variations could be made without detracting from the spirit of the invention. For example, rather than having a pin 330 extending through both the body 310 and web engaging device 320, web engaging device 320 could have a built in axle which could be placed between two halves of body 310, which could then be attached to each other through means of attaching such parts known in the art. There could also be indentations in web engaging device 320 and mating protrusions in two halves of body 310 to achieve the locking features described herein.

Also by way of example, rather than having a recess 322 in web engaging device 320, the web engaging surface 323 could be shorter on each side so that a recess is unnecessary for mounting springs 340. Two springs 340 could be replaced by a single spring. Rather than having a coil torsion spring as shown, a leaf spring could be used.

Preferably, slots 313 are shown for attaching base 350 to body 310. In one embodiment, other means of attachment such as screwing, gluing, welding, or brazing can be used. All parts can be fabricated from any suitable material, including, but not limited to, metals, resins, composites, and plastics.

The alternatives mentioned herein are only exemplary and not limiting. Variations in design can be used without departing from the spirit of the invention. Moreover, the features shown with respect to the illustrated embodiments may be useful in other embodiments of the invention.

As described herein in one embodiment, a component of the present invention may include a housing and further include a yoke. In one embodiment, the yoke is coupleable to the housing when the yoke is engaged with a tongue (e.g. a slip tongue attached to the webbing). For example, the yoke in one embodiment is adapted to engage a surface within the housing to retain the yoke to the housing. In one embodiment, the component includes a housing for carrying the web engaging device that is configured to cooperate with the yoke to secure the component to the vehicle occupant restraint system. In a preferred embodiment, the yoke is coupleable to the housing at various depths within the housing, thus permitting the yoke to engage with tongues of varying sizes. As described herein the housing in one embodiment includes an engagement for accepting a portion of the web engaging device when the component is in the open condition such that the web engaging device is lockable and unlockable with the engagement. In one embodiment, the web engaging device includes a resilient retainer element (e.g. hook) that cooperates with the engagement to toggle the component between the open condition and the engaged condition.

FIGS. 10A-21 show an embodiment of component 1000. Component 1000 may be used as original equipment. Component 1000 is particularly useful in an after-market installation. Component 1000 comprises a body 1010, web engaging device 1020 (illustrated as a unitary cam/lever), a pin 1030, biasing element 1040 (illustrated as a coil spring), a base 1050, and a yoke 1060.

Body 1010 may be slightly wider than the webbing onto which the component 1000 will be installed in order to allow passage of the belt. Body 1010 may be in the shape of a roughly rectangular box open on one side and having opposing sides 1012. Web engaging device 1020 may have a through hole 1021 which, when the component 1000 is assembled will be coaxial with holes 1011 of body 1010.

As shown, web engaging device 1020 is slightly narrower than the inside dimension between sides 1012. In one embodiment, web engaging device 1020 fits snugly between sides 1012. Pin 1030 may be approximately equal to the width of body 1010 across the outer portions of sides 1012 to allow pin 1030 to maintain web engaging device 1020 such that it is free to rotate in a plane parallel to sides 1012. An embodiment of web engaging device 1020 comprises an eccentric cam portion 1024 and a lever portion 1025. In one embodiment, illustrated in FIG. 21, one end of biasing element 1040 is shown mounted on a spring mount 1013 on an inner surface of body 1010 while the opposite end of biasing element 1040 is mounted on a spring mount 1023 of lever portion 1025 of web engaging device 1020 to create a biasing force on lever portion 1025. In one embodiment, the biasing force results in a moment force about the axis of pin 1030 that urges web engaging device 1020 to rotate in the clockwise direction. In the illustrated embodiment, web engaging device 1020 is thus urged to an engaged condition.

In one embodiment, in the default condition of web engaging surface 1022 (which may be a knurled surface or other surface to maintain frictional or other contact with seat belt webbing) of web engaging device 1020 comes into contact with webbing (FIG. 21) as a result of the moment imparted by biasing element 1040 (e.g., the engaged condition).

Figure 14:
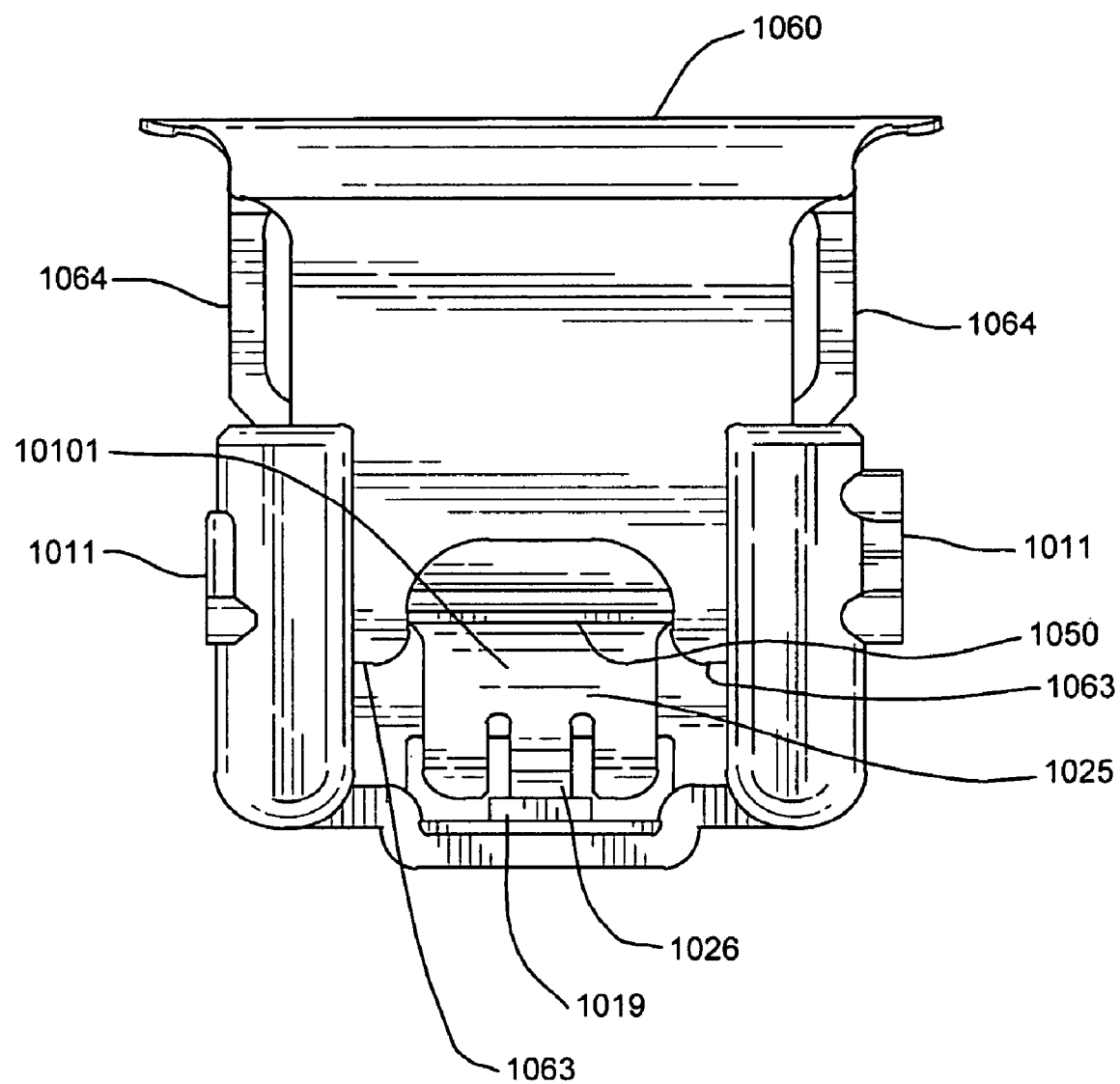
FIG. 14 is a top view of the embodiment of the invention depicted in FIG. 10A.
Figure 16:
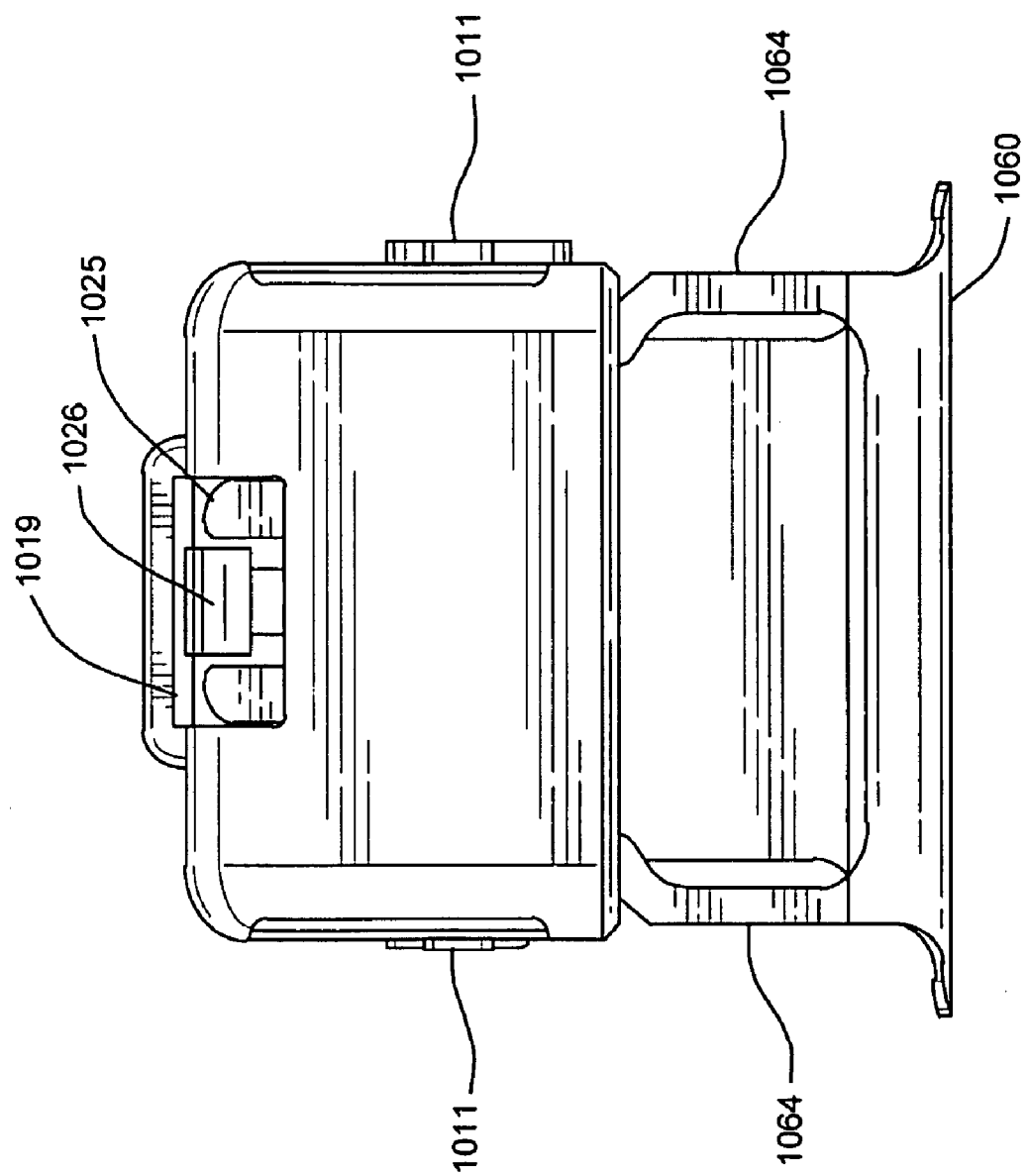
FIG. 16 is a bottom view of the embodiment of the invention depicted in FIG. 10A.
Figure 21:
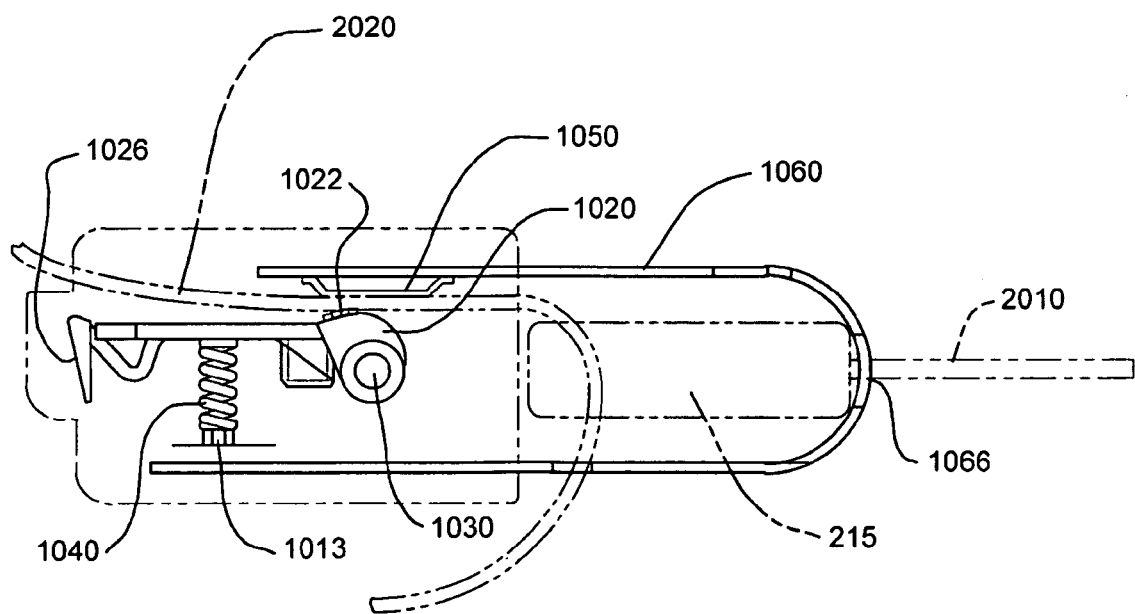
FIG. 21 is a section view of the embodiment of the invention depicted in FIG. 10A showing operation of the device.

In one embodiment, best illustrated in FIGS. 14, 16, and 21, hook 1026 is located at an opposite end of lever portion 1025 than eccentric cam portion 1024. Hook 1026 is adapted such that it will flex to engage hook engagement surface 1019 if lever portion 1025 is pushed hard enough against the bias of biasing element 1040. Pressure on the end of hook 1026 (e.g., roughly in the direction of the axis of pin 1030) releases hook 1026 from hook engagement surface 1019, resulting in the web engaging device 1020 to move as a result of the bias of biasing element 1040.

Figure 12:
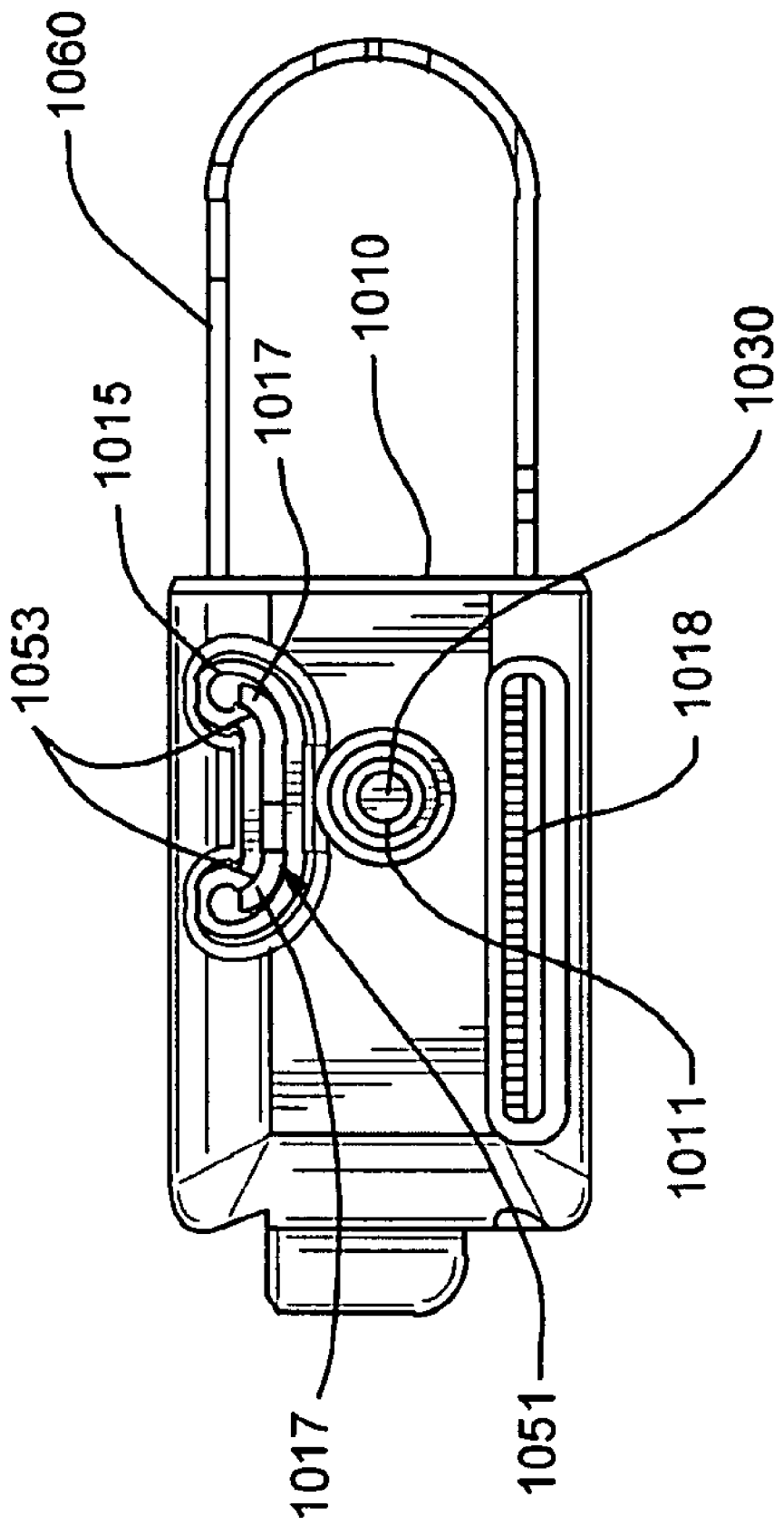
FIG. 12 is a side view of the embodiment of the invention depicted in FIG. 10A.
Figure 13:
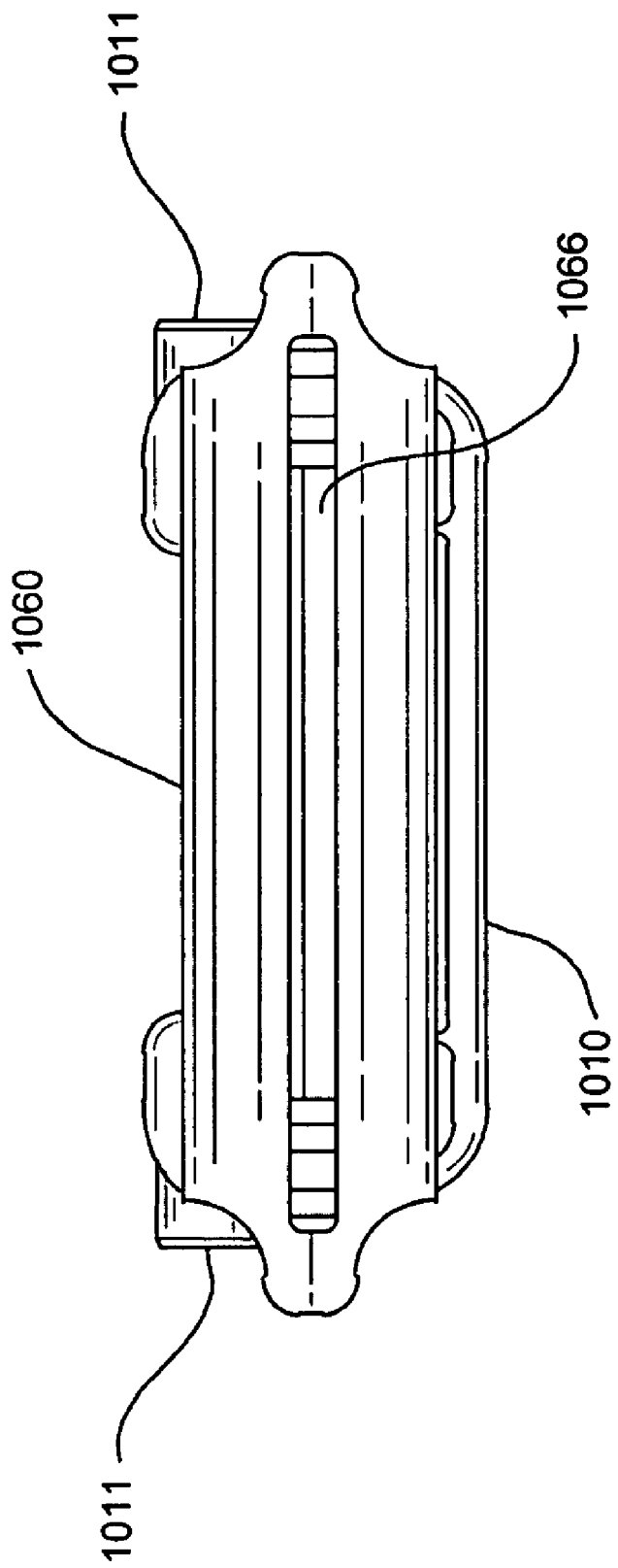
FIG. 13 is a view of an end of the embodiment of the invention depicted in FIG. 10A opposite the end shown in FIG. 11.
Figure 20:
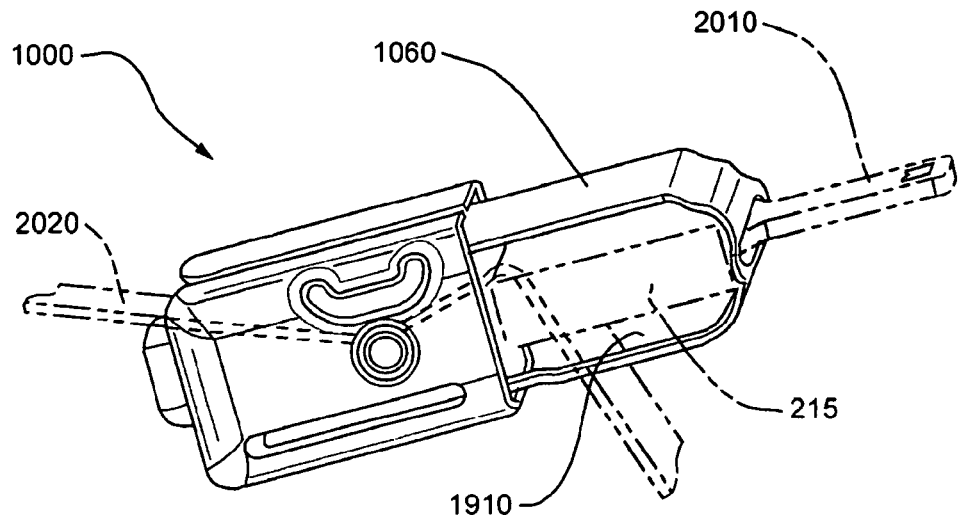
FIG. 20 is a perspective view of the embodiment of the invention depicted in FIG. 10A installed on a three-point continuous loop seat belt system.

One method of assembling component 1000 will now be discussed. FIGS. 12, 20, and 21 show a side view of assembled component 1000. Before installation of component 1000 on the belt webbing, web engaging device 1020 may be placed between opposing sides 1012 of body 1010. In one embodiment, one torsion spring 1040 is oriented on either side of web engaging device 1020 and between opposing sides 1012 of body 1010. Upon aligning through hole 1021 of cam lever 1020 with through hole 1011 of body 1010, pin 1030 may be inserted to retain web engaging device 1020 within sides 1012 of body 1010. The partially assembled component 1000 may then be placed on the webbing with web engaging surface 1022 facing the webbing.

Figure 17:
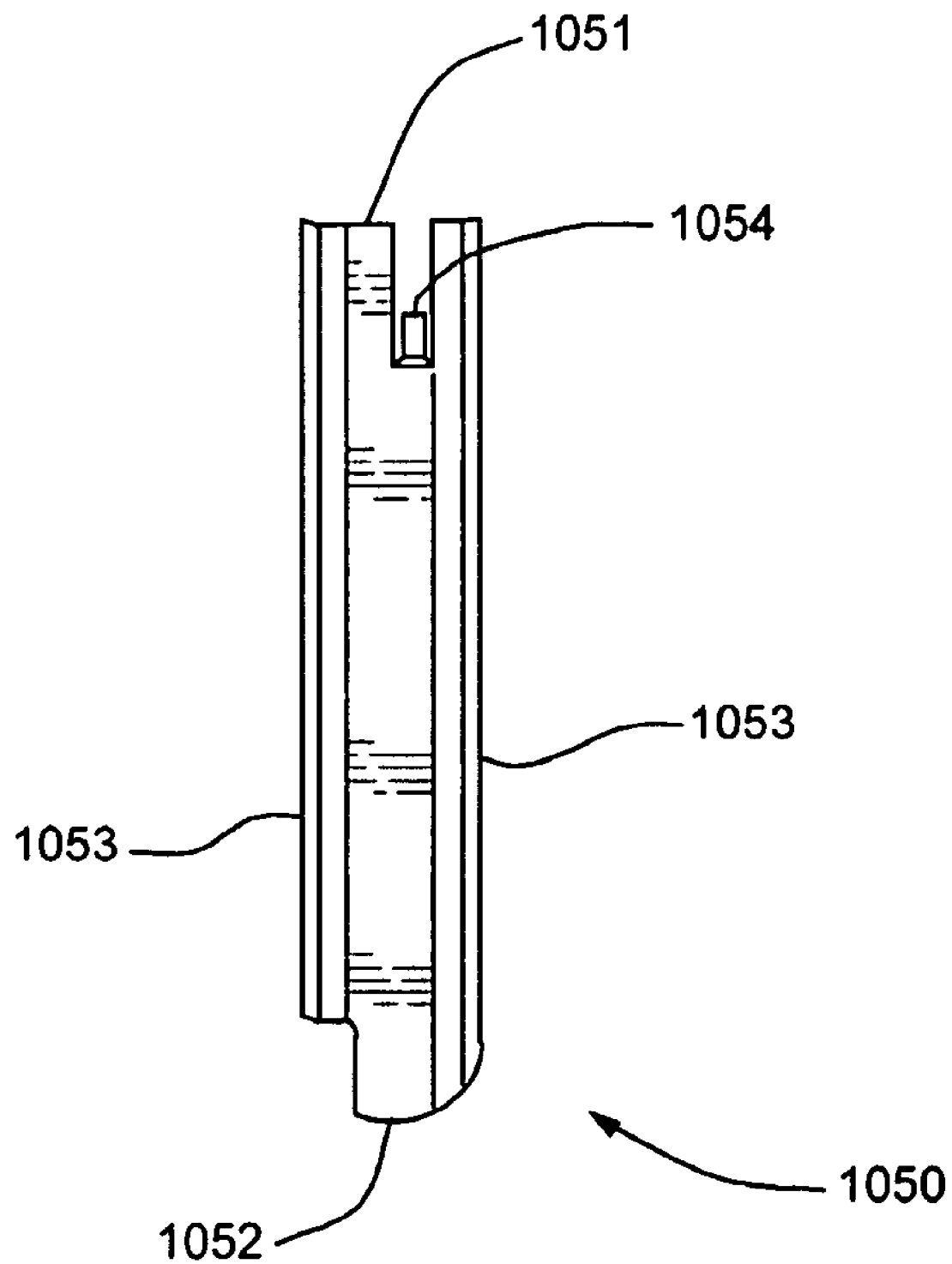
FIG. 17 is a perspective view of a base of the embodiment of the invention depicted in FIG. 10A.
Figure 18:
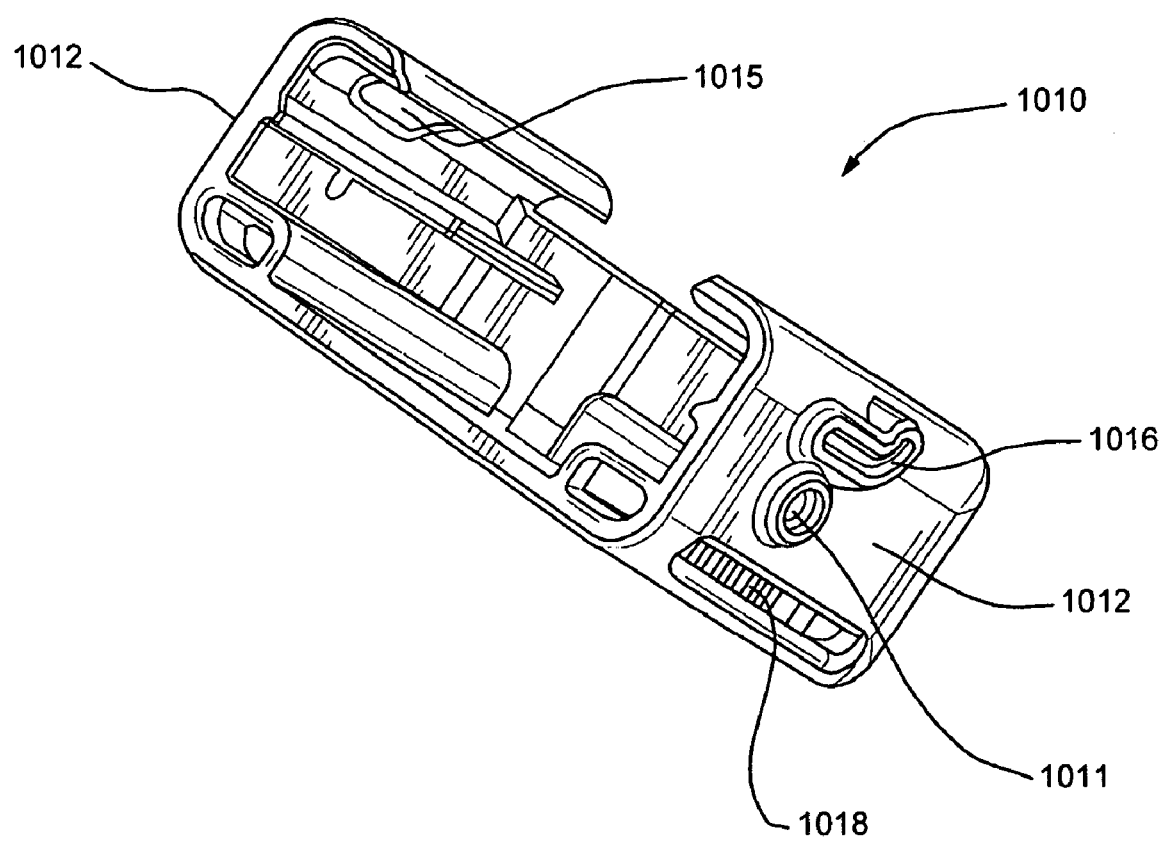
FIG. 18 is a perspective view of the body of the embodiment of the invention depicted in FIG. 10A.

Component 1000 may also include base 1050 (see FIGS. 10B, and 17). In one embodiment, base 1050 provides a rigid surface that web engaging device 1020 urges the webbing into in the engaged condition. In one embodiment, base 1050 is included in body 1010. In one embodiment, base 1050 is included in yoke 1060 (discussed in more detail below). In one embodiment, base 1050 is integral to body 1010. In one embodiment, base 1050 is integral to yoke 1060.

Figure 15:
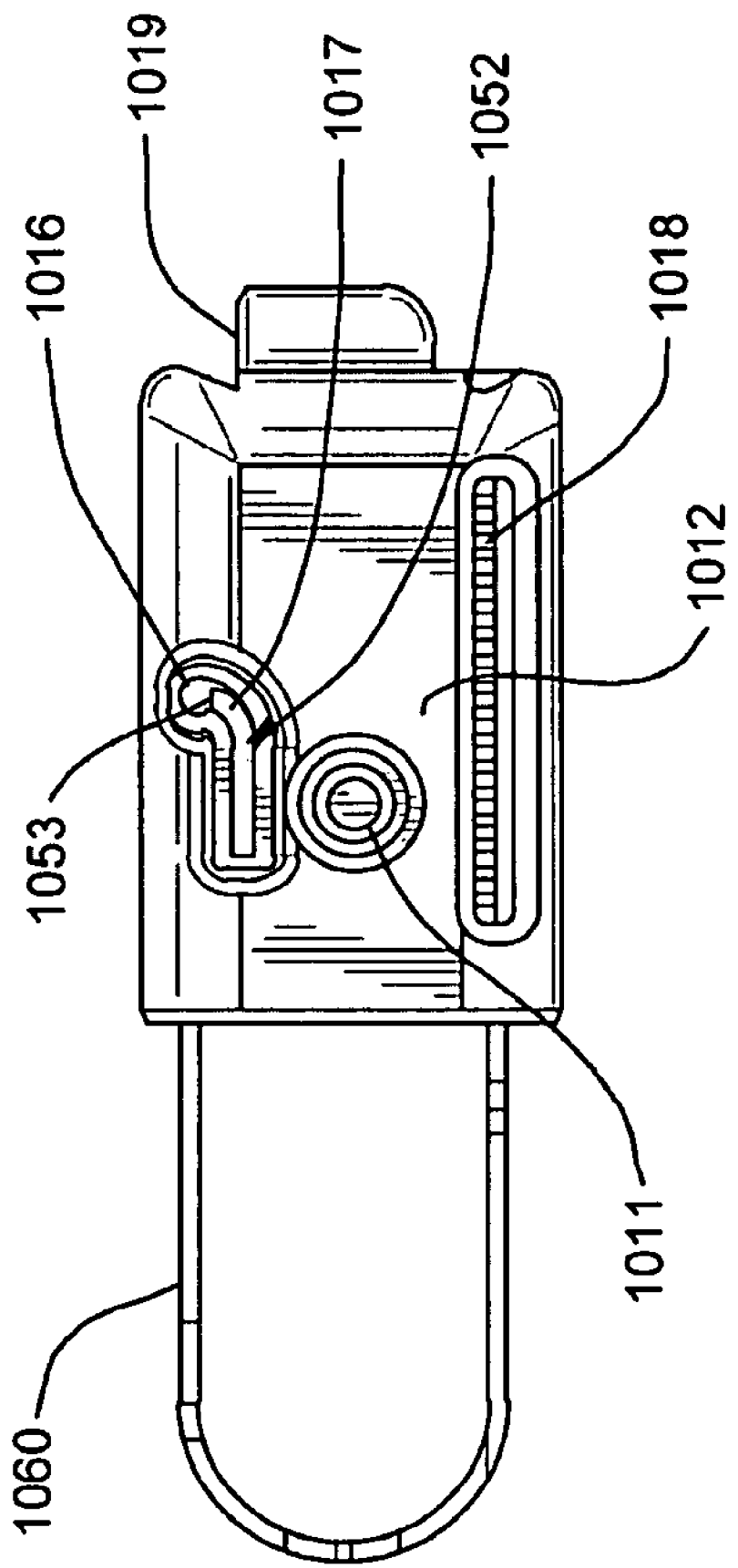
FIG. 15 is a view of a side of the embodiment of the invention depicted in FIG. 10A opposite the side shown in FIG. 12.

In one embodiment, the yoke 1060 does not have sufficient structural rigidity to provide sufficient opposition to the forces from the web engaging device 1020. In another embodiment, a reinforced (through configuration or thickness) yoke 1060 could provide the opposition to the web engaging device 1020, and the base would not be needed. In one embodiment, base 1050, may be fabricated of metal, plastic, or any other suitable rigid material. As shown in FIG. 17, base 1050 may have a first end 1051, upturned sides 1053. In one embodiment, side 1051 meets with two upturned sides 1053 and side 1052 meets with one upturned side 1053, as shown in FIG. 17. First end 1051 and second end 1052 of base 1050 are shown inserted into first slot 1015 and second slot 1016, respectively, of body 1010 (FIG. 10B). As also shown in FIGS. 10B, 12, and 15, first slot 1015 has two upturned sides 1017 and second slot 1016 has one upturned side 1017 to match the first end 1051 and second end 1052 of base 1050. As shown in FIG. 17, the two upturned sides 1053 extend almost the entire length of the base 1050, starting at first end 1051 and ending just short of second end 1052. In one embodiment, the second slot 1016 having only one upturned side 1053 provides a stop for the base 1050 when inserted into first slot 1015 and across the width of base 1050 to second slot 1016. First and second slots 1015 and 1016 of body 1010 are sized and shaped to provide a tight fit for first and second ends 1051 and 1052 of base 1050, respectively, to prevent base 1050 from coming out of body 1010 too easily. Tab 1054 also engages an inside surface of side 1012 of body 1010 to further prevent easy removal of base 1050 from body 1010.

Figure 19:
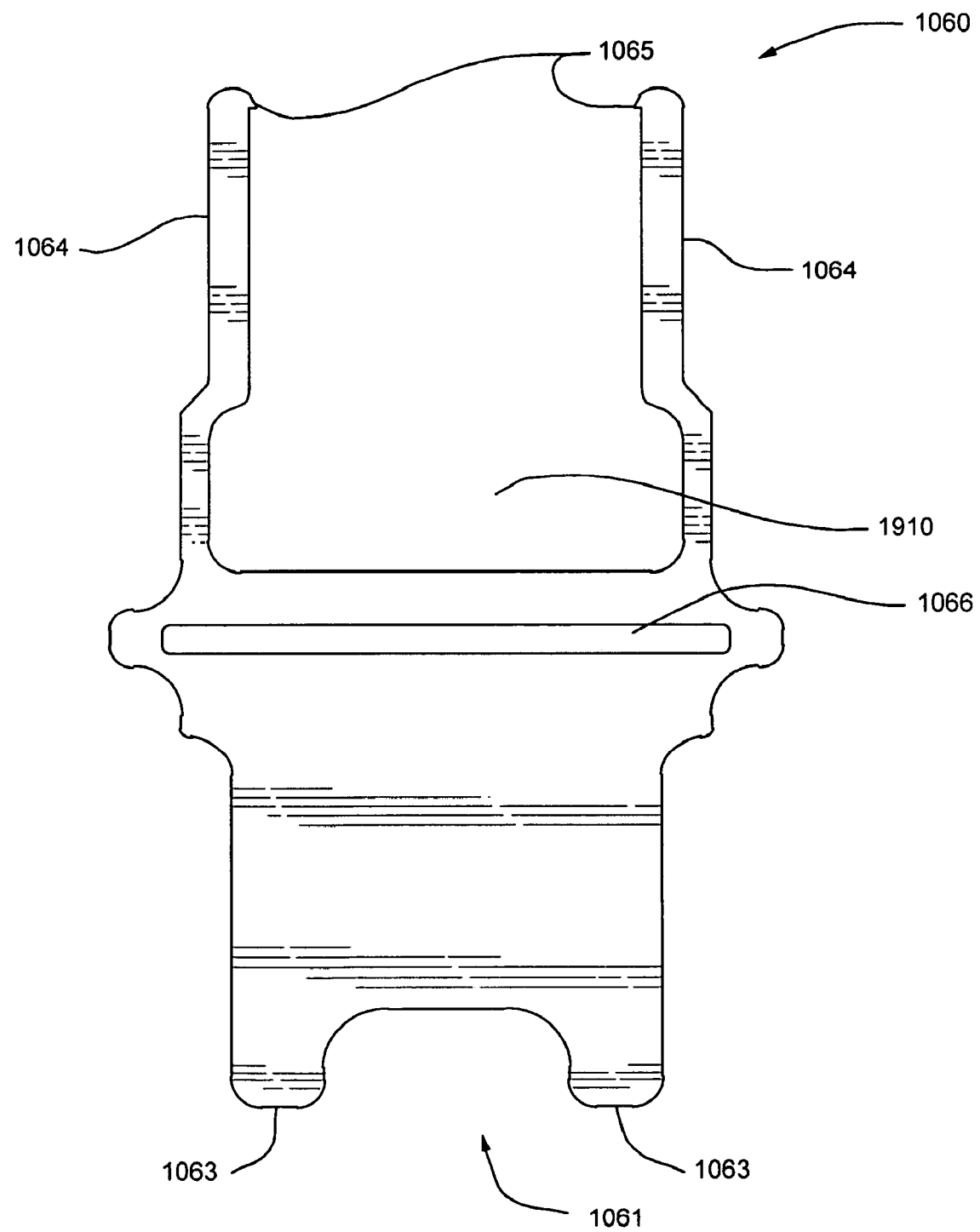
FIG. 19 is a plan view of a yoke of the embodiment of the invention depicted in FIG. 10A.

One embodiment of component 230 includes yoke 1060 as illustrated by component 1000. Yoke 1060 is preferably made of a sheet of metal, although it is not limited to such material. It may be stamped of a flat sheet as shown in FIG. 19. In one embodiment, yoke 1060 includes first end 1061 having two extensions 1063, the outside dimensions of which fits snugly within grooves 1014 of body 1010. Yoke 1060 may also include legs 1064, which end at pawls 1065 pointing toward each other. Pawls 1065 are configured to interact with saw tooth portions 1018 of body 1010. In one embodiment, the narrowness of legs 1064 ensures adequate flexibility when coupling yoke 1060 to body 1010.

In one embodiment, yoke 1060 is configured to include base 1050. In one embodiment, yoke 1060 can be made having no open area between extensions 1063. With changes to the dimensions of body 1010, this makes it possible to eliminate a separate base 1050 by having web engaging surface 1022 push the belt against a surface of yoke 1060. The extensions exist because of the notch cut into the yoke. The notch is needed to allow the fingers access to the lever. There is no real function to the extensions. Note that the notch also requires the base (see 099 above) since without the base, the cam would be pushing against air.

In one embodiment, yoke 1060 includes belt passage 1910 (illustrated in FIG. 19 and as the gap between legs 1064). In one embodiment (e.g., as illustrated in FIG. 21), webbing 220 may be routed through belt passage 1910 when component 230 is fully assembled.

In one embodiment, yoke 1060 includes tongue aperture 1066. In one embodiment, tongue aperture 1066 is a slot or an elongated hole. In one embodiment, tongue aperture 1066 is adapted to allow a least a portion of tongue 215 of a vehicle occupant restraint system to pass through (FIGS. 20, 21). In one embodiment, yoke 1060 and base 1050 cooperate to enclose a portion of tongue 215 within an interior of component 1000 as defined at least partially by base 1050 and yoke 1060.

Yoke 1060 may be bent 180 degrees with a bend radius adequate to accommodate virtually all commercially available seat belt tongues, as illustrated in FIGS. 12 and 21. In one embodiment, the bend is centered on tongue aperture 1066. In one embodiment, the bend radius of yoke 1060 is roughly half the distance between grooves 1014 and saw tooth portions 1018 of body 1010.

One embodiment of a method for installing component 1000 on a vehicle occupant restraint system will now be addressed. FIGS. 20 and 21 illustrates one embodiment of component 1000 installed on a typical seat belt tongue. In one embodiment, webbing 2020 may be slipped into an open side 10101 of body 1010. In embodiments with a separate base, base 1050 may then be slid into first slot 1015 and across the top of webbing 2020 to second slot 1016. Thus, as in FIG. 21, one embodiment of component 1000 is configured and dimensioned such that webbing 2020 is disposed between web engaging surface 1022 and base 1050 whether that base is part of body 1010, or of yoke 1060.

In one embodiment, yoke 1060 may then be placed over belt tongue 2010 such that the portion of belt tongue 2010 that couples with a buckle (not shown) extends through aperture 1066. In one embodiment, yoke 1060 at least partially surrounds a portion of tongue 1010. In one embodiment, yoke 1060 engages with a portion of tongue 1010. In one embodiment, yoke 1060 mates with body 1010. In one embodiment, the mating occurs when extensions 1063 slide into grooves 1014 and legs 1064 slide into the opposite side of body 1010 (e.g., such that pawls 1065 engage saw tooth portions 1018 of body 1010). In one embodiment, this couples component 1000 with belt tongue 2010. In one embodiment, saw tooth portions 1018 allow yoke 1060 to be inserted into body 1010 to various depths to accommodate belt tongues of various sizes.

In one embodiment, component 1000 is lockable in the open condition (e.g., when hook 1026 is engaged with hook engagement surface 1019). In one embodiment, component 1000 is toggleable into the engaged condition by disengaging hook 1026 of web engaging device 1020 from hook engagement surface 1019. In one embodiment, this disengagement of hook 1026 allows web engaging device 1020 to rotate as a result of the biasing force of biasing element 1040. This puts web engaging surface 1022 of web engaging device 1020 into contact with webbing 2020, at least substantially preventing loosening of the lap belt portion of webbing 2020, but allowing tightening of the lap belt portion of webbing 2020 (e.g., the engaged position). As will be noted, pressing hook 1026 such that it engages hook engagement surface 1019 allows the webbing 2020 to move both ways within component 1000 (e.g., the open condition).

The embodiment illustrated is only exemplary. Variations could be made without departing from the spirit of the invention. Some features of the embodiments disclosed herein in connection with a particular embodiment will be useful in other embodiments or may be eliminated without departing from the spirit of the invention. Some modifications may be similar to those mentioned with respect to the first embodiment above. A few other variations are described below by way of example only.

Figure 22:
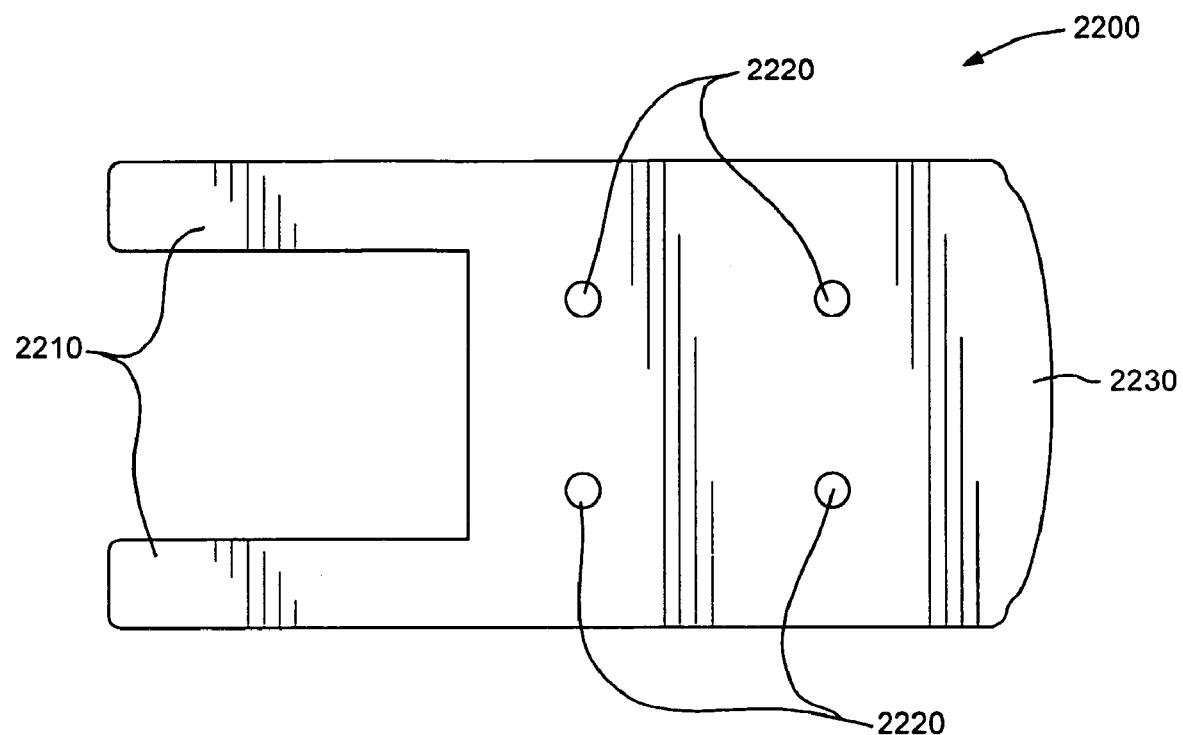
FIG. 22 is a plan view of a clip that can be used to install the invention depicted in FIG. 10A on a child seat.
Figure 23:
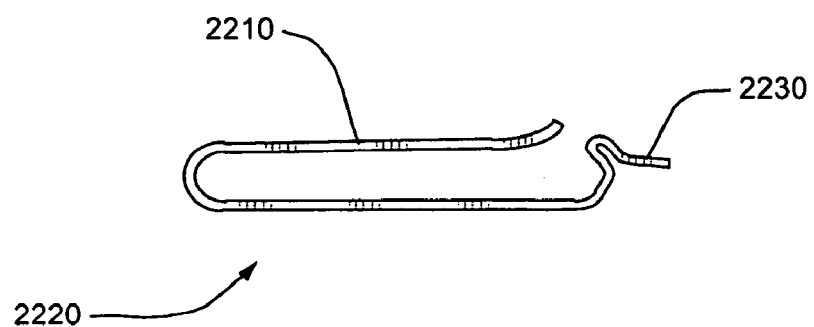
FIG. 23 is a side view of the clip shown in FIG. 22.

FIG. 22 shows a plan view of a clip blank 2200 for attaching one embodiment of the invention to a child car seat or booster seat. In one embodiment, clip 2200 from metal, although clip 2200 could also be molded from plastic. Holes 2220 allow the clip to be screwed or riveted onto the child car seat or booster seat. Any other means of attaching clip 2200 can be used including, but not limited to, adhesives, welding, brazing, etc. FIG. 23 shows a side view of the clip 2200 after it has been molded or bent into shape from a metal blank. Legs 2210 are bent so as to allow engagement with grooves in component 230 (e.g., grooves 1014 of body 1010). In one embodiment, clip 2200 is configured and dimensioned to be retained on component 230. For example, front portion 2230 of clip 2200 may be bent as shown in FIG. 23 such that once body 1010 is slid over feet 2210 of clip 2200, the front portion 2230 retains body 1010 on clip 2200. In one embodiment, clip 2200 is configured and dimensioned to be releasable from component 230. In one embodiment, releasing body 1010 from clip 2200 involves putting pressure downward on front portion 2230 of clip 220 and/or lifting up on body 1010 and sliding it in the direction of front portion 2230.

Figure 24:
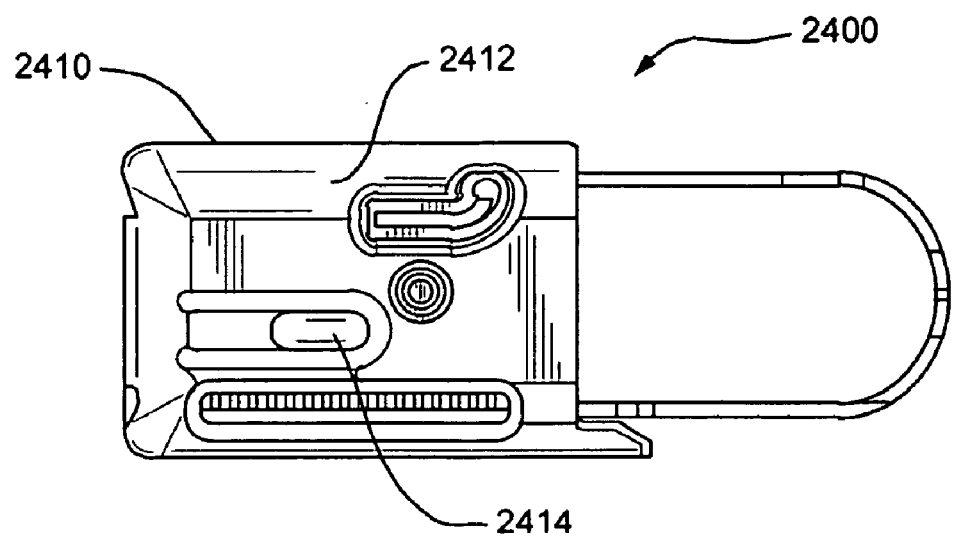
FIG. 24 is a side view of a body of the invention depicted in FIG. 10A with an alternate means of locking and unlocking the device.
Figure 25:
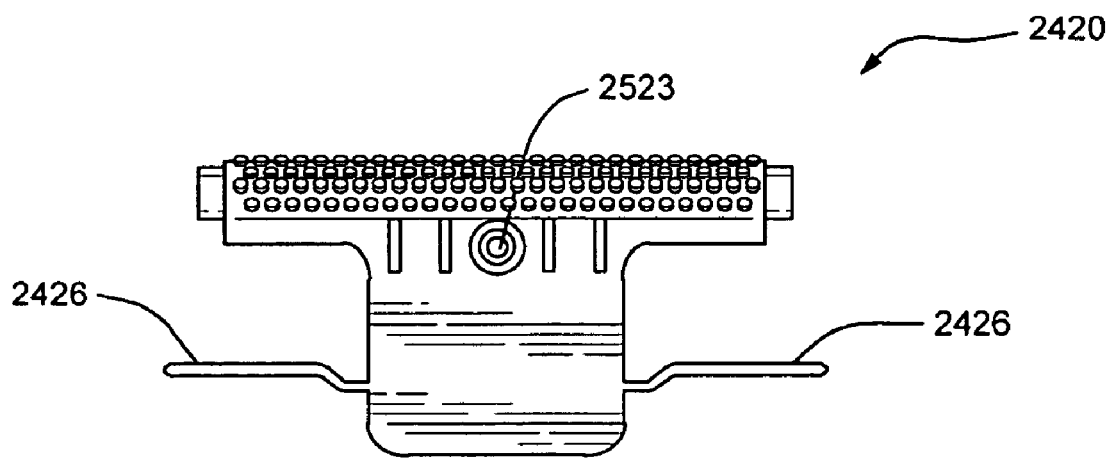
FIG. 25 is a plan view of a web engaging device for the variation of the invention depicted in FIG. 24.

A variation of the means of locking and unlocking component 2400 is shown in FIGS. 24 and 25. In one embodiment, there is a component 2400 that includes a body 2410. In one embodiment, body 2410 differs from body 1010 in that body 2410 has a button 2414 formed in each of sides 2412. Buttons 2414 may be cantilevered portions of side 2412 that may be pushed inward by a user. FIG. 25 illustrates one embodiment of web engaging device 2420 that is a variation of web engaging device 1020. Rather than having hook 1026 of web engaging device 1020, web engaging device 2420 has side arms 2426 that keep component 2400 in the unlocked state by engaging the area of sides 2412 above buttons 2414 so as to push them slightly in an outward direction, with the areas of sides 2412 above buttons 2414 providing an engagement surface for buttons 2414. Pressing buttons 2414 toward each other causes side arms 2426 to flex inward so as to disengage from the engagement surfaces of sides 2412.

Figure 26:
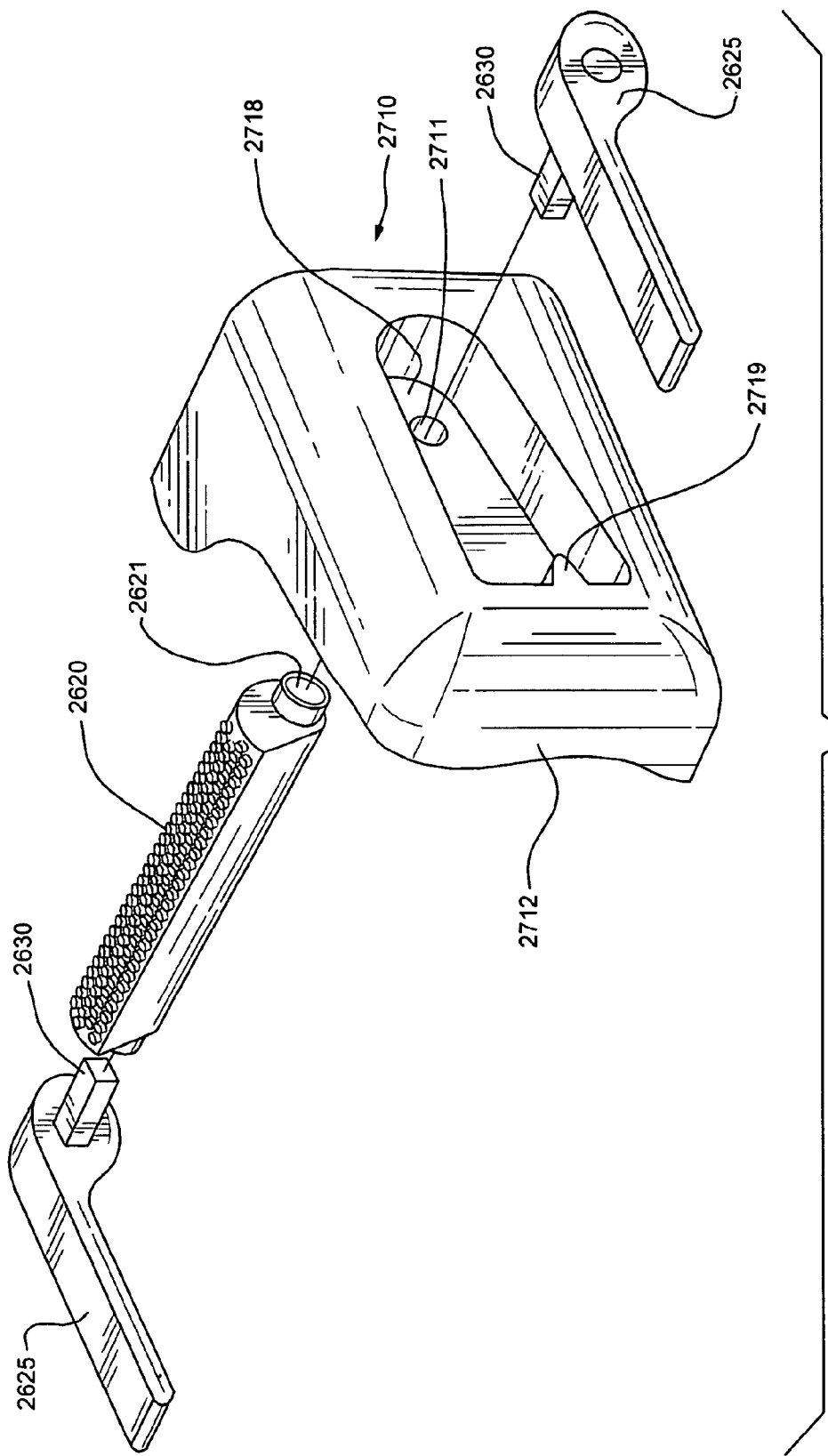
FIG. 26 is a perspective view of an alternate means of controlling the locking and unlocking of the embodiment of the invention depicted in FIG. 10A.
Figure 27:
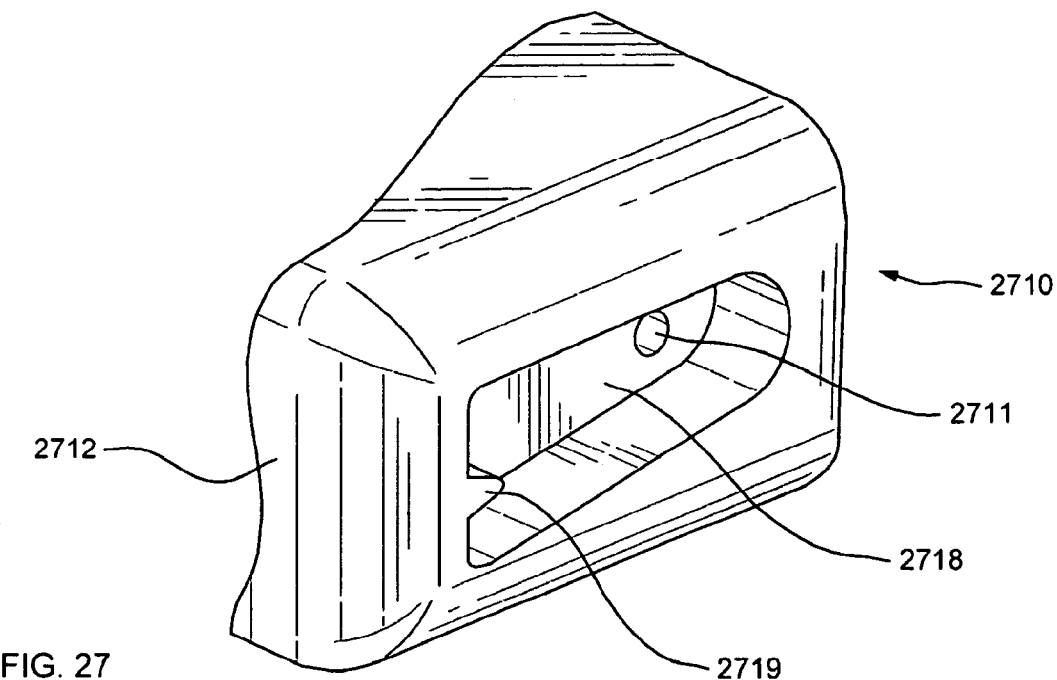
FIG. 27 is a perspective view of a side portion of a body according to a variation of the embodiment of the invention shown in FIG. 10A.
Figure 28:
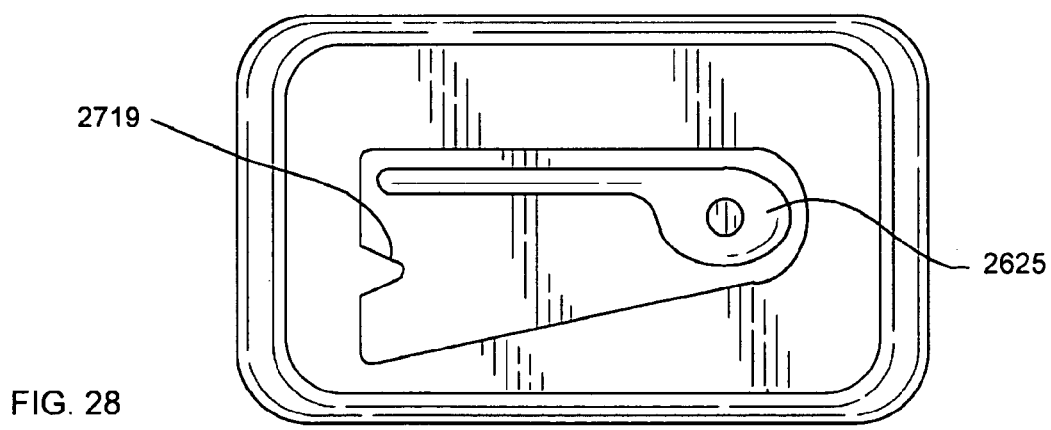
FIG. 28 is a cross-section of another embodiment of the invention depicted in FIG. 10A in a first state.
Figure 29:
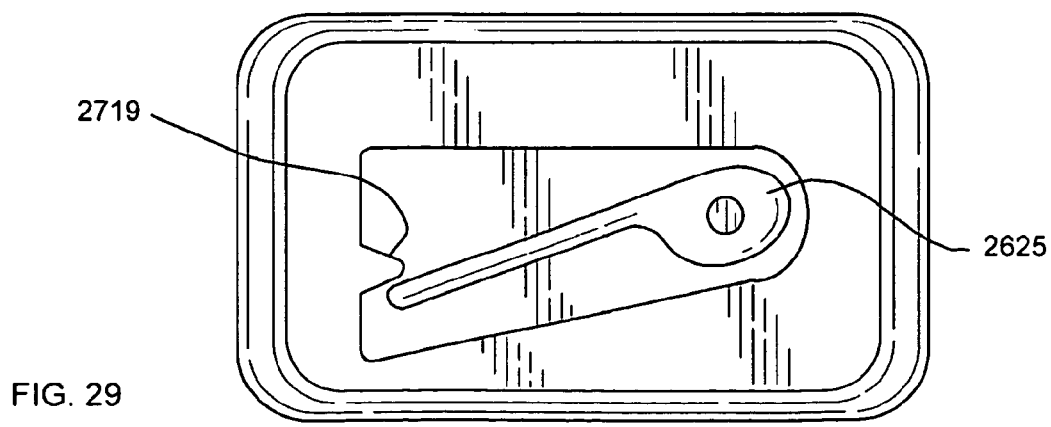
FIG. 29 is a cross-section of an alternate means of locking the embodiment of the invention depicted in FIG. 10A.

FIGS. 26-29 show another means of locking and unlocking web engaging device 230 as it toggles between the engaged condition and open condition. In one embodiment, there is at least one switch 2625 having an axle 260. In the embodiment illustrated in FIG. 26, two lever portions and two axles are employed. As illustrated in FIG. 26, in one embodiment, each of axles 2630 of lever portions 2625 pass through hole 2711 on a side 2712 housing (both sides not shown in FIG. 26) and engage a hole 2621 of web engaging device 2620. As shown in FIG. 27, body 2710 (e.g., that may correspond to body 1010 in the embodiment of the invention depicted in FIG. 10) has a recessed area 2718 on side 2712 of body 2710. Thus in one embodiment, switch 2625 (illustrated as a lever in FIG. 29) may be located within body 2710. Through hole 2711 goes through each side 2712 of body 2710 within recessed area 2718. FIG. 28 shows switch 2625 in a locked engaged condition. FIG. 29 shows lever portion in a locked position engaging protrusion 2719 such that component 230 is locked in the open condition. In other embodiments, the unlocked position may be an open condition and/or unlocked position may be the engaged condition. In one embodiment, a biasing device such as a coil spring, torsion spring, etc. may be used to bias switch 2625 to the engaged or open condition. In one embodiment, a portion of switch 2625 may extend beyond recessed area 2718 to facilitate operation of switch 2625.

Figure 30:
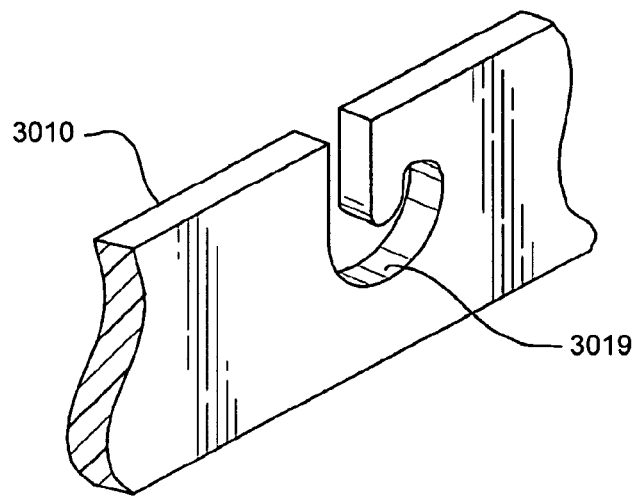
FIG. 30 is a perspective view of a portion of another alternate means of controlling the locking and unlocking of the embodiment of the invention depicted in FIG. 10A.
Figure 31:
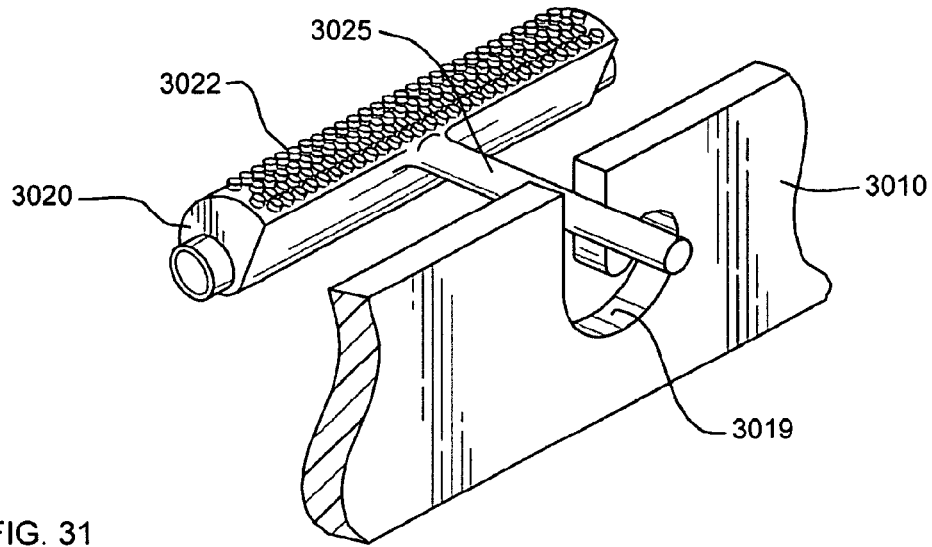
FIG. 31 is a perspective view of the means of controlling the locking and unlocking shown in FIG. 30 in a locked state.
Figure 32:
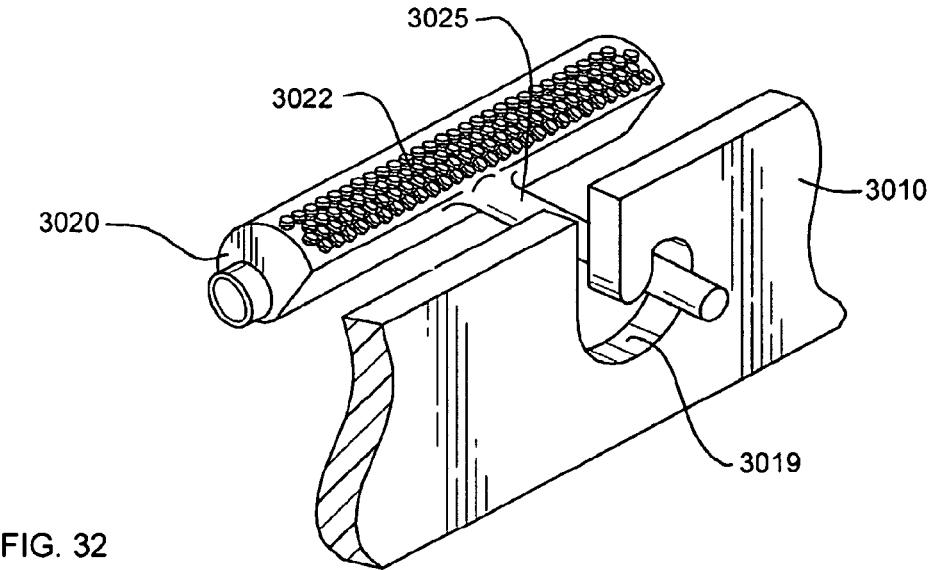
FIG. 32 is a perspective view of the means of controlling the locking and unlocking shown in FIG. 30 in an unlocked state.

FIGS. 30-32 show an optional means of locking a component 230. Body 3010 includes a J-shaped slot in an end of body 3010 opposite a seat belt tongue. Web engaging device 3020 (e.g., a switch) has an engaging surface 3022 and a lever portion 3025. A user wishing to disengage component 230 would push down on lever portion 3025 and slide it into the opposite end of J-shaped slot 3019 to lock the component 230 in the open condition. To unlock the device, a user would push down again and push lever portion 3025 toward the open portion of J-shaped slot 3019. This variation may include a torsion spring or other biasing element to bias cam lever 3020 toward the unlocked position or a compression spring biasing lever portion 3025 upward as shown in FIGS. 31 and 32. Either lever portion 3025 may have the flexibility to bend toward the opposite ends of J-shaped slot 3019 of web engaging device 3020 and may be able to slide in an axial direction.

While not shown, another optional means of locking a component (e.g., a belt cinch) is to have a straight slot in the body into which a lever portion 3025 could be pushed, with a latch to keep lever portion in the down position, locking the component (e.g., a belt cinch).

In one embodiment, there is a component of a vehicle occupant restraint system, the vehicle occupant restraint system having a webbing with a lap belt portion and a shoulder belt portion contiguous with the lap belt portion wherein the component includes a web engaging device adapted to toggle between an open and an engaged condition. As described herein, in one embodiment, in the open condition the webbing is moveable relative to the web engaging device in two directions along the webbing. Also as described herein in one embodiment, in the engaged condition the webbing is moveable relative to the web engaging device in only one direction along the webbing. In one embodiment, the web engaging device is lockable in the open condition. In one embodiment, there is a component that automatically moves from the open condition (e.g., the locked open condition) to the engaged condition automatically. In one embodiment, automatic movement of the component from the open condition to the engaged condition is achieved by engaging a tongue with a buckle (e.g., by buckling the seat belt). Similarly, in one embodiment, the component automatically moves from the engaged position to the open condition automatically. In one embodiment, the automatic movement of the component from the open condition to the engaged condition occurs upon unbuckling of the seat belt. Thus in one embodiment, the component is lockable in the open condition until the component is automatically or manually moved to the engaged condition. In one embodiment, the component is lockable in the engaged position until manually or automatically placed in the open condition. Moreover as described in more detail herein, the component may be momentarily engaged (e.g., by a user operating a switch) or momentarily placed in the open condition (e.g., by a user operating the switch).

Thus in one embodiment, the component of the present invention includes a housing with a web engaging device that is configured to automatically engage with a belt webbing upon engagement of the component with a buckle. The component may also be configured such that the web engaging device automatically disengages from the belt webbing upon unbuckling.

Figure 33:
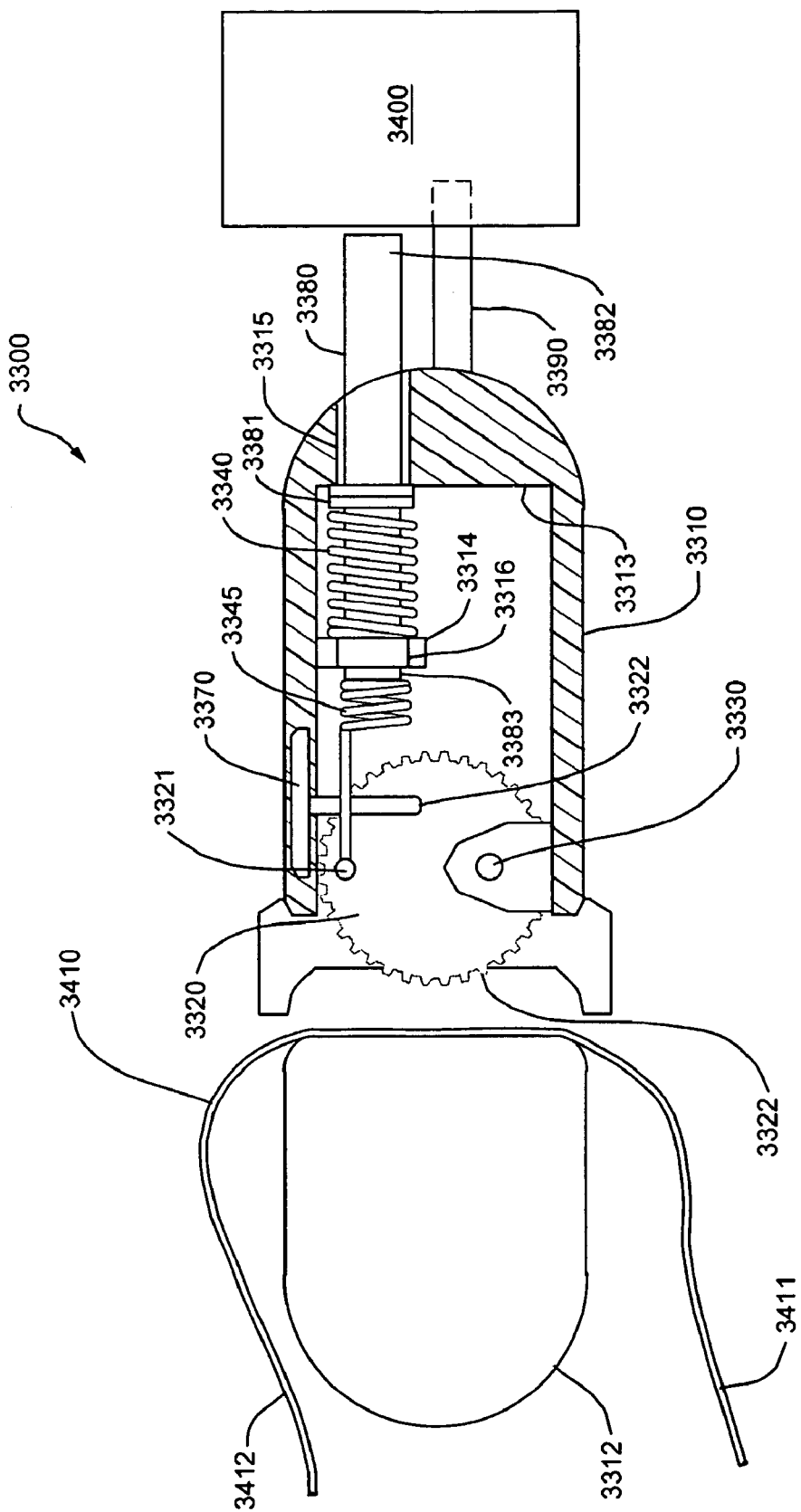
FIG. 33 is a section view of another embodiment of the invention in a first condition.
Figure 34:
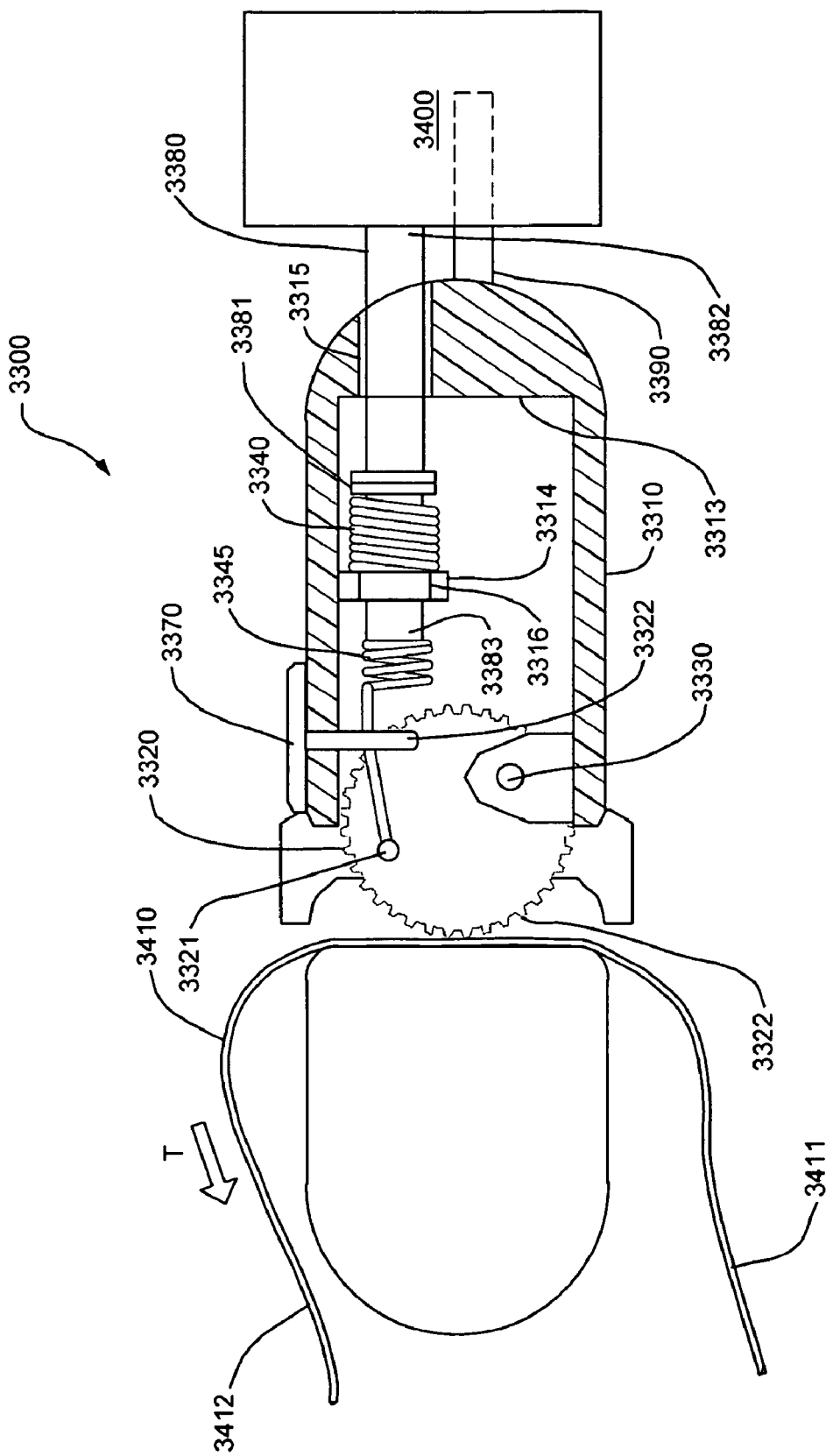
FIG. 34 is a section view of the embodiment of the invention shown in FIG. 33 in a second condition.

In one embodiment, the automatic movement of from the engaged position to the open condition occurs is caused by a mechanical device. For example, FIGS. 33 and 34 show cross-sections of another embodiment of the component 3300. In one embodiment, component 3300 includes body 3310 and web engaging device 3320 (which may include a cam as illustrated in FIGS. 33 an 34), axle 3330, first compression spring 3340, second compression spring 3345, switch 3370, plunger 3380, and latch plate 3390. As illustrated in FIG. 33, in one embodiment, when latch plate 3390 is disengaged from buckle 3400, plunger 3380, which is preferably free to slide back and forth within aperture 3315 in body 3310, is extended outward to its fullest extent. In one embodiment, component 3300 also includes plunger flange 3381 that is configured to contact front inside face 3313 of body 3310 as a result of the bias from first spring 3340, which is confined between plunger flange 3381 and body bulkhead 3314. In one embodiment, plunger 3380 also slides freely within hole 3316 in body bulkhead 3314. In the open condition illustrated in FIG. 33, webbing 3410 is free to slide back and forth along the length of the webbing (i.e., in two directions).

In one embodiment such as that illustrated in FIG. 34, when latch plate 3390 is inserted into buckle 3400, front end 3382 of plunger 3380 comes into contact with buckle 3400, forcing plunger 3380 in the direction of web engaging device 3320. In one embodiment, second spring 3345 pivotally links the aft end 3383 of plunger 3380 to a first connection 3321 on web engaging device 3320. Thus, as plunger 3380 approaches web engaging device 3320, second spring 3345 pushes web engaging device 3320 at first connection 3321, causing web engaging device 3320 to pivot about axle 3320 (illustrated in a counterclockwise direction. Because web engaging device 3320 rotates about an off-center axis (axle 3330), pushing web engaging device 3320 at first connection 3321 results in contact surface 3322 of web engaging device 3320 coming into contact with webbing 3410 and forcing webbing 3410 against aft portion 3312 of body 3310. Contact surface 3322 may have a knurled surface or any other surface that serves to prevent movement of webbing 3410 when contact surface 3322 presses webbing 3410 against aft portion 3312 of body 3310. In this second condition, the movement of webbing 3410 is restricted in at least one direction (e.g., in one embodiment, webbing 3410 can only be moved in direction T shown in FIG. 34). Plunger 3380 may be made of such a length that it is not necessary for buckle 3400 to engage tongue 3300 in order for web engaging device 3320 to engage webbing 3410. Instead, plunger 3380 may be fabricated such that buckle 3400 coming within, e.g., half an inch of tongue 3300 may result in web engaging device 3320 engaging webbing 3410. Disengaging buckle 3400 and tongue 3300 (and moving them far enough apart if required by the configuration) automatically disengages and returns tongue 3300 to a slip tongue position. Thus, in one embodiment, there is a component (e.g., component 3300) that includes a housing having a latch plate extending therefrom, a web engaging device at least partially housed within the body, and a feature such as plunger 3380 which causes the web engaging device to engage a belt webbing upon engagement of the latch plate with a buckle. In one embodiment, the web engaging device is biased in the unengaged condition (e.g. locked in an open condition) until the component is buckled. Preferably, the component further includes a disengagement device that permits the web engaging device to momentarily disengage from the belt webbing without unbuckling the latch plate from the buckle. For example, the component may include a disengagement device (e.g. switch 3370) that causes the web engaging device to disengage from the belt webbing upon manual activation by the user. Thus, the web engaging device remains locked in the engaged condition until the component is unbuckled or through activation of a disengagement device.

Webbing 3410 may be considered to be divided into lap belt portion 3411 and shoulder belt portion 3412 contiguous to each other. In one embodiment, component 3300 provides the dividing line between the lap belt and shoulder belt portions 3411 and 3412, respectively. In one embodiment allowing movement only in direction T when component 3300 is in the engaged condition, first seat belt portion 3411 may be made shorter, but not longer.

In one embodiment, during use (e.g., when a load is put on component 3300), switch 3370 (illustrated in FIG. 33 as a button) may be activated to allow slack in lap belt portion 3311 of seat belt web 3310. In one embodiment, this slack may be allowed temporarily or switch 3370 may be locked in the open condition. In one embodiment, switch 3370 is pivotally linked to cam second connection 3323. In one embodiment, activating switch 3370 (e.g., by pushing it in a downward direction) creates a moment about axle 3330, causing web engaging device 3320 to rotate in a clockwise direction such that contact surface 3322 no longer presses webbing 3410 against aft body portion 3312 of body 3310. In one embodiment, when component 3300 is unbuckled it returns to the open condition as illustrated in FIG. 33.

FIG. 36 shows several alternate means of attaching component 230 to a seat belt tongue. Component 36100 is attached to seat belt tongue 36500 by attaching upper side 36110 to a lower clamp (not shown) by inserting screws 36120 through holes 36130 to engage the lower clamp. Lower clamp and upper side 36110 may be contoured to fit the curves of a typical seat belt tongue. In one embodiment, screws 36120 do not penetrate any part of tongue 36500.

Component 36200 is shown glued to tongue 36500.

Component 36300 comprises a yoke 36310 that hooks around tongue 36500 on one side. Component 36300 further has cut-out sections 36320 that may be slightly wider than tab members 36330. To install component 36300 on tongue 36500, yoke 36310 may be first slid over the latch plate end 36510 of tongue 36500. Cut-out sections 36320 may then be held over tab members 36330 and pushed past them against a biasing force from release levers 36340 until yoke 36310 snaps past release levers 36340 and yoke 36310 is retained in a vertical direction by release levers 36340 and in a horizontal direction by raised portion 36350. Body 36350 may butt against tongue 36500. Yoke 36310 may be removed from tongue 36500 by pressing down on release levers 36340 so that yoke 36310 may be slid over release levers 36340 far enough that cut-out portions line up with tab members 36330 and yoke 36310 lifted away from body 36350. In one embodiment, component 36300 requires no tools for installation.

Component 36400 comprises a yoke 36410 that may be slid into body 36450. Component 36400 may have tab members similar to tab members 36330 located on body 36450. Body 36450 may also have "living hinges" that are biased to snap into cut-out sections in yoke 36410 similar to cut-out sections 36320, providing a positive lock of yoke 36410 to body 36450. In one embodiment, component 36400 requires no tools for installation.

FIG. 37 shows yet another means of attaching component 230 to a seat belt tongue. Component 3700 may comprise a yoke 3710, a lower body, a retaining bracket 3720, and a thumb screw 3730. Retaining bracket 3720 may hook onto an end of lower body 3720 and include a threaded hole 3721. Alternatively, retaining bracket 3720 may be unitary with lower body 3720. Yoke 3710 may be slipped over latch plate 36510 of tongue 36500. Grooves 3722 of lower body 3720 may be slid over yoke 3710. Thumbscrew 3730 may be inserted into non-threaded hole 3711 in flange 3712 of yoke 3710. Thumbscrew 3730 may then be tightened to retain component 3700 to tongue 36500. In one embodiment, component 3700 requires no tools for installation.

While the yokes 36310, 36410, and 3710 are shown as flat where they are inserted into lower body portions, they may also be ribbed or corrugated for strength.

FIG. 38 shows yet another means of attaching component 230 to a seat belt tongue. Component 3800 comprises a hinged section 3810 that fits over seat belt webbing and is then closed. Tongue 36500 may be slid into tongue retaining section, which may have a ribbed or frictional retention surface and/or an interference fit. Optional hinge 3830 may be used to permit motion of the tongue relative to component 3800. Although hinge 3811 and hinged section 3830 are shown as traditional multiple part hinges, they may also be "living hinges."

Figure 39:
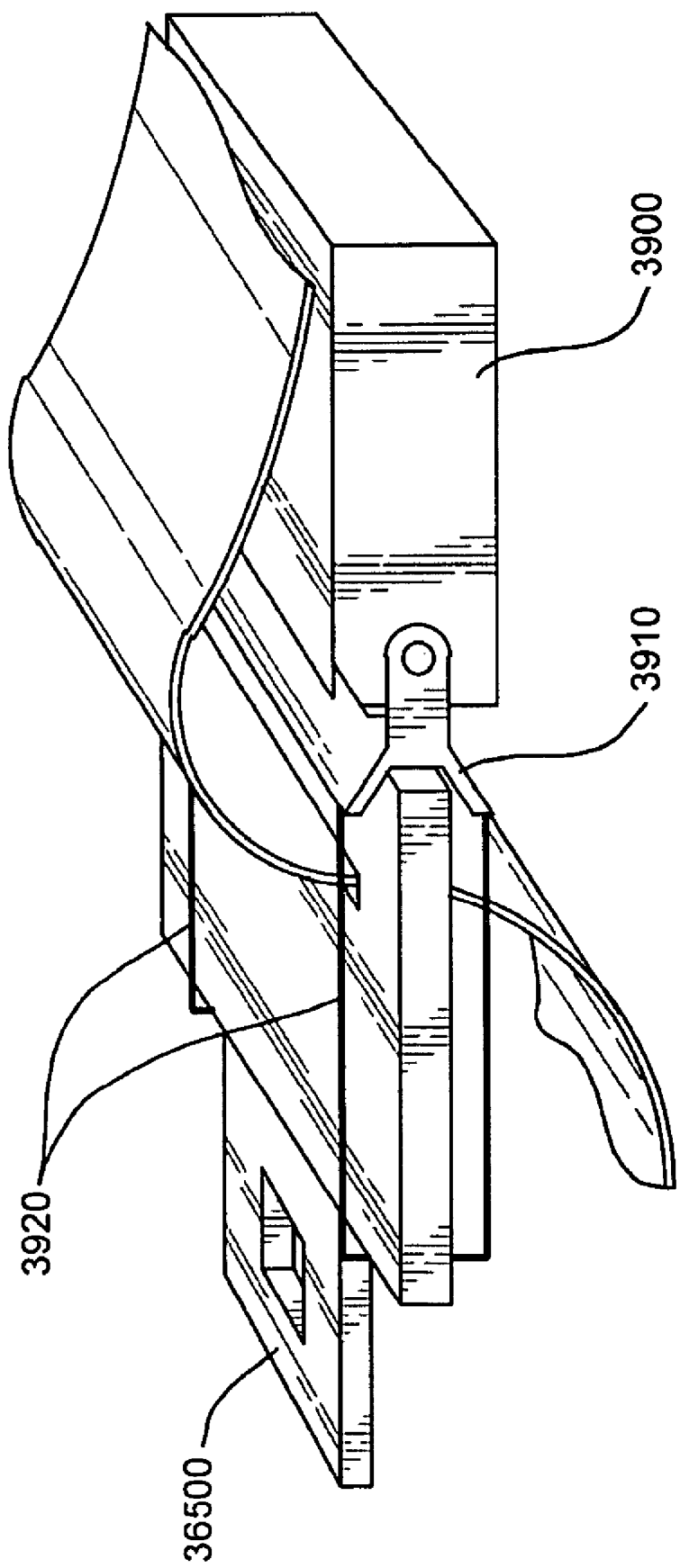
FIG. 39 shows another means of attaching a component according to the present invention to a seat belt tongue.

FIG. 39 shows still another means of attaching component 230 to a seat belt tongue. Component 3900 is attached to tongue 36500 by elastic bands 3920. Although component 3900 is shown with a hinged section 3910, the hinge is optional.

The specific embodiments contained herein are only exemplary. Variations to the specific details of the embodiments disclosed may be made without detracting from the spirit of the invention. Those variations may include the elimination of some of the features identified in the exemplary embodiments or the substitution of features among the exemplary embodiments. Other variations and modifications in the details, materials, steps and arrangement of parts, which have been herein described and illustrated in order to explain the nature of the preferred embodiment of the invention may be made without departing from the spirit or scope of the invention. Any dimensions referenced herein are preferred approximate dimensions. Those skilled in the art will recognize that any dimensions selected to achieve the objectives of the present invention are within the scope thereof.

What is claimed is:

1. A component of a vehicle occupant restraint system, the vehicle occupant restraint system having a webbing with a lap belt portion and a shoulder belt portion contiguous with the lap belt portion, the component comprising:
   a web engaging device configured to be coupled to a portion of a buckle assembly, the portion of the buckle assembly coupled to a remainder of the buckle assembly in a buckled configuration, the web engaging device being adapted to toggle between an open condition and an engaged condition while the portion of the buckle assembly is in the buckled configuration;
   wherein in the open condition the webbing is moveable relative to the web engaging device in two directions along the webbing;
   wherein in the engaged condition the webbing is moveable relative to the web engaging device in only one direction along the webbing.

2. The component of claim 1 wherein the web engaging device is adapted to be at least one of:
   a) lockable in the open condition until manually or automatically toggled into the engaged condition;
   b) lockable in the engaged position until manually or automatically toggled into the open condition;
   c) momentarily toggled into the engaged condition; and
   d) momentarily toggled into the open condition.

3. The component of claim 1, wherein the web engaging device comprises:
   a web engaging surface configured to engage the webbing in the engaged condition,
   and a switch that is positionable to cause the web engaging surface to disengage from the webbing and into the open condition.

4. The component of claim 3, wherein the web engaging surface is positioned on a cam.

5. The component of claim 4, wherein the switch includes a lever arm attached to the cam, the lever arm being selectively engageable with a feature of the component to lock the component in the open condition.

6. The component of claim 5, wherein a biasing device is configured to impact the switch to bias the belt engaging surface against the webbing in the engaged condition.

7. The component of claim 1 further comprising,
   a biasing device configured to bias the web engaging device toward at least one of the open condition and the engaged condition.

8. The component of claim 1, wherein the portion of the buckle assembly includes a slip tongue attached to the webbing, the component further comprising:
   a yoke for engaging the slip tongue; and
   a housing for carrying the web engaging device, the housing configured to cooperate with the yoke to secure the component to the vehicle occupant restraint system.

9. The component of claim 8, wherein the housing further comprises an engagement for accepting a portion of the web engaging device when the component is in the open condition such that the web engaging device is lockable and unlockable with the engagement.

10. The component of claim 9, wherein the web engaging device further comprises a resilient retainer element that cooperates with the engagement to toggle the component between the open condition and the engaged condition.

11. The component of claim 1 further comprising,
    a housing, wherein a portion of the web engaging device is configured to engage with the housing to lock the web engaging device in the open condition.

12. The component of claim 11, wherein the housing engaging portion includes at least one of a spring clip, a sliding retainer, a detent, a servo-relay, an electrical magnet, a permanent magnet, or a pin.

13. The component of claim 1, wherein the component is adapted to permit a tension to be maintained in the lap belt portion that is greater than a tension in the shoulder belt portion when the component is in the engaged condition.

14. The component of claim 1 further comprising,
    a slip tongue engageable with a buckle.

15. The component of claim 14, wherein the web engaging device is adapted to automatically toggle from the open condition to the engaged condition when the slip tongue is engaged with the buckle.

16. The component of claim 14, wherein the web engaging device is adapted to automatically toggle from the engaged condition to the open condition when the slip tongue is disengaged from the buckle.

17. The component of claim 1, wherein slack developed in the shoulder belt portion is not translatable to the lap belt portion when the component is in the engaged condition.

18. A system including the component of claim 1 and comprising:
a tension detector operably engaged with the vehicle occupant restraint system to detect an indicia of tension in the webbing.

19. The system of claim 18, wherein the tension detector includes at least one of a tensiometer, a strain gauge, a resistor wire embedded in the webbing, a webbing deflection detector, a spring-loaded mechanical switch, a pressure applicator applied to the webbing, a sonic detector, an ultra sonic detector, an optical detector, a strain gauge, or an ammeter.

20. The system of claim 18 further comprising:
a tensioner configured to tension the webbing to a predetermined tension when a slip tongue of the vehicle occupant restraint system is first engaged with a buckle.

21. The system of claim 18 further comprising:
a tensioner configured to tension the webbing after a predetermined time measured from when the web engaging device is toggled from the engaged condition to the open condition.

22. The system of claim 18 further comprising:
a tensioner coupled to the tension detector and configured to de-activate upon the detection by the tension detector of a predetermined indicia of tension in the webbing.

23. The system of claim 22, wherein the tension detector is configured to de-activate the tensioner after a predetermined indicia of tension is reached in the lap belt portion.

24. The system of claim 18 further comprising:
a tensioner configured to tension the webbing to a tension taken from at least one of a preset tension and a user specified tension.

25. The component of claim 1 further comprising:
a housing having two opposing side portions, the web engaging device secured to both side portions such that the web engaging device is pivotable between the opposing side portions to toggle the component between the open condition and the engaged condition; and
a switch associated with the web engaging device, positioned within an opening of the housing and configured and dimensioned to toggle the web engaging device between the open condition and the engaged condition.

26. The component of claim 25, wherein a portion of the switch positioned within the housing is accessible to a user when the component is under load.

27. The component of claim 25, wherein the housing further comprises a plate securable to both side portions such that the webbing is disposed between the web engaging device and the plate, the component being configured and dimensioned such that web engaging device urges the webbing against the plate when the component is the engaged condition.

28. The component of claim 1 further comprising:
a housing; and
a yoke coupleable to the housing when the yoke is engaged with the portion of the buckle assembly, the portion of the buckle assembly including a tongue.

29. The apparatus of claim 28, wherein the yoke is adapted to engage a surface within the housing to retain the yoke to the housing.

30. The component of claim 28, wherein the yoke is coupleable to the housing at various depths within the housing.

31. The component of claim 1 further comprising:
a housing, wherein the housing includes an engagement for accepting a portion of the web engaging device when the component is in the open condition such that the web engaging device is lockable and unlockable with the engagement.

32. The component of claim 1 further comprising:
a locking mechanism configured to releaseably retain the web engaging device in the open condition while the portion of the buckle assembly is in the buckled configuration.

33. The component of claim 1, wherein web engaging device is configured to remain in the engaged condition independent of a tension on the webbing.

* * * * *